United States Patent
Tripathi et al.

(10) Patent No.: US 7,710,988 B1
(45) Date of Patent: May 4, 2010

(54) METHOD AND SYSTEM FOR NON-DETERMINISTIC FINITE AUTOMATON FILTERING

(75) Inventors: Devendra Tripathi, San Jose, CA (US); Keith Kong, San Jose, CA (US); Alak Deb, San Jose, CA (US); Debashis Chatterjee, San Jose, CA (US)

(73) Assignee: Xambala Corporation, San Jose, CA (US)

( * ) Notice: Subject to any disclaimer, the term of this patent is extended or adjusted under 35 U.S.C. 154(b) by 1057 days.

(21) Appl. No.: 11/373,228

(22) Filed: Mar. 10, 2006

Related U.S. Application Data

(63) Continuation-in-part of application No. 11/348,827, filed on Feb. 6, 2006, now abandoned.

(60) Provisional application No. 60/661,284, filed on Mar. 11, 2005, provisional application No. 60/661,263, filed on Mar. 11, 2005, provisional application No. 60/661,220, filed on Mar. 11, 2005, provisional application No. 60/661,282, filed on Mar. 11, 2005.

(51) Int. Cl.
*H04L 12/28* (2006.01)

(52) U.S. Cl. .................. 370/411; 370/395.52

(58) Field of Classification Search ............ 370/395.52; 707/6, 100; 709/231
See application file for complete search history.

(56) References Cited

U.S. PATENT DOCUMENTS 6,952,694 B2 * 10/2005 Mathur et al. .................. 707/6

| | | |
|---|---|---|
| 2002/0009076 A1 | 1/2002 | Engbersen et al. |
| 2004/0059725 A1 | 3/2004 | Sharangpani et al. |
| 2004/0215593 A1 | 10/2004 | Sharangpani et al. |
| 2006/0149840 A1 | 7/2006 | Thompson et al. |
| 2007/0025351 A1 | 2/2007 | Cohen |

OTHER PUBLICATIONS

Oberg et al., "Transition Graph Representation of FSM and its application to State Minimization in the ProGram complier," Electronic System Design Laboratory, Royal Institute of Technology, 1998, Stockholm, Sweden.

(Continued)

*Primary Examiner*—Chi H Pham
*Assistant Examiner*—Fan Ng
(74) *Attorney, Agent, or Firm*—Martine Penilla & Gencarella LLP

(57) ABSTRACT

A structural matching engine for non-deterministic filtering operations is provided. The structural matching engine includes an active node processor (ANP) configured to process a state of an active list to determine possible future states of a non-deterministic finite automaton (NFA). The ANP processes the state according to rules. The structural matching engine includes an active list processor (ALP) configured to initiate a lookup for a token value corresponding to the state of the active list. The ALP provides a next sate of the active list to the ANP for processing according to the rules upon completion of the processing of the state by the ANP, wherein the possible future states of the NFA are linked by the ALP to form a target list, the target list stacked on top of the active list in a data structure. A processor and a method for filtering data associated with non-deterministic states are also included.

18 Claims, 12 Drawing Sheets

OTHER PUBLICATIONS

Sproull et al., "*Wide-area Hardware-accelerated Intrusion Prevention Systems (WHIPS)*," International Working Conference on Active Networking (IWAN), Oct. 27-29, 2004, Lawrence, Kansas, USA.

Madhusudan et al., "*Design of a System for Real-Time Worm Detection*," 12th Annual Proceedings of IEEE Hot Interconnects (HotI-12); Stanford, CA, Aug. 2004, pp. 77-83.

Schuehler et al., "*Architecture for a Hardware-Based, TCP/IP Content-Processing System*" IEEE Micro, vol. 24, No. 1, Jan. 2004, pp. 62-69.

Lockwood et al., "*Application of Hardware Accelerated Extensible Network Nodes for Internet Worm and Virus Protection*," International Working Conference on Active Networks (IWAN), Kyoto, Japan, Dec. 2003.

Moscola et al., "*Implementation of a Content-Scanning Module for an Internet Firewall*," FCCM, Napa, CA, Apr. 9-11, 2003.

Chang et al., Real-Time Protocol Analysis for Detecting Link-State Routing Protocol Attacks, Feb. 2001, ACM Transactions on Information and System Security, vol. 4, No. 1, pp. 1-13.

Abbes et al., Protocol Analysis in Intrusion Detection Using Decision Tree, 2004, IEEE.

Song et al., Efficient Packet Classification for Network Intrusion Detection using FPGA, Feb. 2005, ACM, pp. 238-245.

Vaidehi et al., A Semantics Based Application Level Intrusion Detection System, Feb. 2007, IEEE, pp. 338-343.

Oberg, Johnny, "*ProGram: A Grammar-Based Method for Specification and Hardware Synthesis of Communication Protocols*," Royal Institute of Technology, Department of Electronics, Electronic System Design, 1999, Stockholm, Sweden.

AnaGram, "*Introduction to Syntax Directed Parsing*," Copyright 1993-2002, Parsifal Software, http://www.parsifalsoft.com/isdp.html, pp. 1-10.

Hiran Ramankutty, "*Yacc/Bison—Prser Generators—Part I*," Copyright 2003, Published in Issue 87 of Linux Gazette, Feb. 2003, http://www.linuzgazette.com/copying.html, pp. 1-7.

M.E. Lesk et al., "*Lex—A Lexical Analyzer Generator*."

Zerksis D. Umrigar, "*Introduction to Shift-Reduce Parsing*," Copyright 1997, http://www.cs.binghamton.edu/~zdu/parsdemo/srintro.html, pp. 1-6.

"*Lexical analysis*," Wikipedia, the free encyclopedia, http://en.wikipedia.org/wiki/Lexer, pp. 1-2.

Donnelly et al., *Bison*, The YACC-compatible Parser Generator, Nov. 1995, Bison Verison 1.25.

"*LR parser*," Wikipedia, the free encyclopedia, http://en.wikipedia.org/wiki/LR_parser, pp. 1-7.

Vern Paxson, "*Flex, version 2.5*" A fast scanner generator, Edition 2.5, Mar. 1995.

Biswadeep Nag, Staff Engineer, Performance Engineering, Sun Microsystems, "*Acceleration Techniques for XML Processors*," XML Conference, 2004.

Biswadeep Nag, "*Acceleration Techniques for XML Processors*," XML 2004, Proceedings by SchemaSoft, pp. 1-12.

\* cited by examiner

METHOD AND SYSTEM FOR NON-DETERMINISTIC FINITE AUTOMATON FILTERING

CLAIM OF PRIORITY

This Application claims the benefit of U.S. Provisional Patent Application 60/661,282 entitled "Method And System For Semantic Processing Via Hardware Implementation," filed on Mar. 11, 2005; U.S. Provisional Patent Application 60/661,220 entitled "Method And System For Semantic Processing Via Channellization" filed Mar. 11, 2005; U.S. Provisional Patent Application 60/661,263 entitled "Method And System For Semantic Processing Via Parse Tree Filtering" filed Mar. 11, 2005; and U.S. Provisional Patent Application 60/661,284 entitled, "Method And System For Semantic Processing Via Data Thinning" filed on Mar. 11, 2005. The above-listed provisional applications are incorporated herein by reference in their entireties.

This application is a continuation-in-part application under 35 U.S.C. §120 and claims priority from U.S. patent application Ser. No. 11/348,827, entitled, "Hardware Thread Controller with Application to Embedded Processors" and filed on Feb. 6, 2006 now abandoned. This Application is incorporated herein by reference in its entirety.

CROSS REFERENCE TO RELATED APPLICATIONS

This Application is related to U.S. patent application Ser. No. 10/753,846 entitled "Method And Apparatus For Semantic Processing Engine" filed Jan. 7, 2004; U.S. patent application Ser. No. 10/753,727 entitled "Semantic Processing Engine" filed Jan. 7, 2004; U.S. patent application Ser. No. 10/753,305, entitled "Method And Apparatus For Intrusion Prevention System" filed on Jan. 7, 2004; U.S. patent application Ser. No. 10/753,584 entitled "Method And Apparatus For Content Based Security" filed Jan. 7, 2004; U.S. patent application Ser. No. 10/861,722 entitled, "Content Processing Unit API Documentation" filed Jun. 4, 2004; U.S. patent application Ser. No. 10/898,473 entitled "Methods And System For Handling Email Security And Spam" filed Jul. 22, 2004; and U.S. patent application Ser. No. 11/373,729 entitled, "Methods and Systems for Preprocessing Streaming Data to Perform Data Thinning Before Processing of the Streaming Data" and filed on Mar. 10, 2006. All of the above-listed applications and provisional applications are hereby incorporated by reference in their entireties.

BACKGROUND

Conducting everyday communication through email messages (e-mail) has become routine for millions of people all over the world. Consequently, this medium is being used as a fairly inexpensive way of sending messages to a large number of people. Most of these messages are unsolicited by the Internet user. These unsolicited messages are commonly referred to as "spam." Besides being a nuisance to the Internet user, some of these spam message distributions are so large that it can have a crippling effect on large portions of the Internet.

Apart from being inundated with spam, network systems need to be protected from unwanted intrusion. Intrusion may include viruses that can disable a network system. Other forms of intrusion may include attack from hackers trying to gain unauthorized access to a network system. There are a number of known methods for filtering spam and viruses in order to secure a network system. For example, one method searches for catch phrases by looking at specific strings. Another method involves a challenge response scheme whereby, when someone sends an email, the mail is placed in the recipient's mailbox until it is confirmed that the sender is authorized to sent emails to the recipient. Another approach is to check whether the sender of the email belongs to the white list or black list of the recipient. This method automatically weeds out the senders who are in the black list.

The problem with the approaches described above is that the computing power available to do other tasks is consumed by the filtering process and this can significantly affect the functionality of the client, as well as require excessive memory. Also, the approaches are restricted to certain mail formats and will not allow new mail formats or protocols without updating the filtering software. Another shortcoming of current filtering techniques occurs with regard to publish and subscribe systems where timeliness of delivery is a factor. For example, RSS news feeds are commonly available and people subscribe to them. Alternatively, for stock trading information, the subscriber of the agent, e.g., Charles Schwab, would like to get access to the information. It should be appreciated that with the value of news and financial information disappearing over time, it is imperative to route such data quickly to the subscribers.

Furthermore, with regard to filtering semantic data, there is no known hardware based method, especially in a multi-flow environment. Therefore, it is necessary to have a method and a system to filter content in general and streaming content in particular, according to a set of queries/specifications, without consuming excessive computing power of the system.

SUMMARY

Broadly speaking, the present invention fills these needs by providing a system that efficiently filters/routes data. It should be appreciated that the present invention can be implemented in numerous ways, including as a process, an apparatus, a system, a device, or a method. Several inventive embodiments of the present invention are described below.

In one embodiment, a method for filtering data according to a query using a non-deterministic finite automaton (NFA) is provided. The method initiates with initializing the NFA to a first state. The method includes compiling the query into a NFA state table and a lookup table. A token (having value as token value) is received. A match of the token value is searched for in the lookup table based on the first state and a corresponding state record in the NFA state table. A plurality of next states are generated based on a search record and the plurality of next states are saved above the first state in a stack structure.

In another embodiment, a processor having execution operations driven by received data is provided. The processor includes an index and filtering engine (IFE) configured to perform non-deterministic finite automaton based filtering operations on the received data according to a query provided to the IFE. The IFE includes a control message processor (CMP) configured to receive a token (having value as token value, a data structure) and pass the token to a filter action engine (FAE). The CMP is configured to managing of flow contexts and scheduling of the tokens to FAE and other filtering related hardware. The IFE includes a key generation unit (KGU) configured to monitor a signal line between the CMP and the FAE to detect transmission of a token. The KGU is further configured to generate a key from the token value in response to detecting transmission of the token with certain flags (for example a flag which indicates that token marks "start" of a message segment defining a structural entity). Tokens with flags indicating start of segment defining a structural entity will be referred in rest of the document as "start token". A lookup module (LKM) is included in the IFE and is configured to search for a match to the key value in a table populated by a query compiler, also known as lookup table. The LKM is triggered by the FAE or NFA. The IFE further includes a non-deterministic finite automaton (NFA) block configured to process the start token to determine future possible states for the start token by building a dynamic data structure, also known as TransID nodes having state elements, wherein a current state element is used to generate the future possible states.

In yet another embodiment, details for a non-deterministic finite automaton (NFA) are provided. The NFA includes an active node processor (ANP) configured to process a state of an active list to determine possible future states of the NFA. The ANP processes the state according to rules. The structural matching engine includes an active list processor (ALP) configured to initiate a lookup for a token value corresponding to the state of the active list. The ALP provides a next sate of the active list to the ANP for processing according to the rules and upon completion of the processing of the state by the ANP, the possible future states of the NFA are linked by the ALP to form a target list, the target list stacked on top of the active list in a data structure.

The advantages of the present invention will become apparent from the following detailed description, taken in conjunction with the accompanying drawings, illustrating by way of example the principles of the invention.

BRIEF DESCRIPTION OF THE DRAWINGS

The present invention will be readily understood by the following detailed description in conjunction with the accompanying drawings, and like reference numerals designate like structural elements.

The present invention will be readily understood by the following detailed description in conjunction with the accompanying drawings, and like reference numerals designate like structural elements.

DETAILED DESCRIPTION

Figure 1:
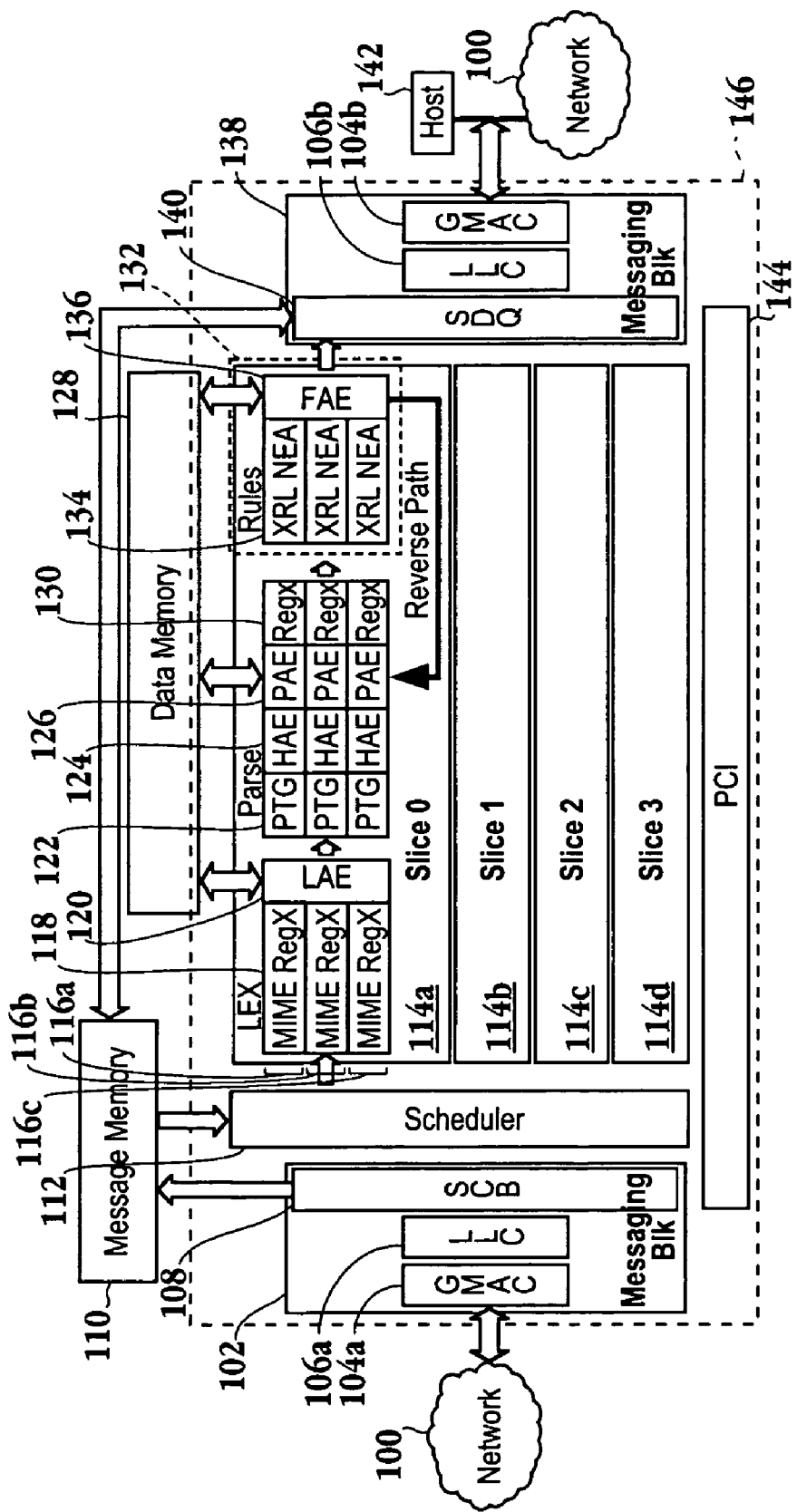
FIG. 1 is a high-level simplified schematic diagram of the architecture for an integrated circuit configured to enable semantic processing at inline speeds in accordance with one embodiment of the invention.

An invention is described for a system, apparatus and method for performing semantic processing for the purpose of among others, to provide security and implement web services based upon message content. In particular, the embodiments below describe various filtering operations supportive of the semantic processing. It will be obvious, however, to one skilled in the art, that the present invention may be practiced without some or all of these specific details. In other instances, well known process operations have not been described in detail in order not to unnecessarily obscure the present invention.

The embodiments described herein provide a method and system that enable a processor configured to perform semantic operations on high speed network traffic. The processor is designed to work in conjunction with general purpose central processing units (CPUs) and network processing units (NPUs), TCP offload engines (TOE), Secure sockets layer (SSL) accelerators, etc., through standard interfaces. In one embodiment, the programmable processor accelerates the processing of parameters for application-to-application communication, storage and data center solutions, in addition to security applications. Rather than parse and process fixed size integer fields in the headers of packets, as performed by existing packet processing devices, the semantic processing engine referred to herein parses and processes the actual message of the packet in order to understand the meanings associated with the message. The ability to understand the meaning of the messages in packet based networks allows for a more powerful Intrusion Detection System (IDS), for example. In addition, an administrator may be able to set rules to enable the filtering of communications within an organization or between the organization and external recipients. Numerous configurations for the functionality described herein are available. For example, the processor may be integrated into a router, a network interface card or some other suitable adapter card, an appliance or a host system. "Lexeme" when used, implies token value (used mostly when value type is string.

Described in more detail below are embodiments for an indexing and filtering engine that performs structural matching for streaming data in-line. The structural matching techniques use non-deterministic finite automaton, i.e., where the incoming data may create multiple transitions and lead to multiple future states. While structural matching is described in detail below, it should be appreciated that predicate transformations may also be performed in order to ease the burden on downstream processes performing any predicate evaluation. In one embodiment, the messages for explicitly tagged languages, e.g., Extensible Mark-up Language, etc., are filtered by the embodiments described herein. In another embodiment, the query for performing the filtering is specified in a standard and structured manner, e.g., XPATH, XQUERY, etc. As used herein, the term, message, is used to denote the token data structure as it passes from one semantic processing engine to another. In this context, data message or data token are used to denote those data structures which are derived from the input message processing and control message or control token are those which are used for control purposes (most importantly for context and grammar management). When not qualified, "token" means data token. The token represents a data structure and "token value" implies various fields of the data structure (see Table 1B for details). The term production string (also termed as Predicate String or Pstring in short) is used to denote a string value stored in memory and pointed by a pointer embedded in token data structure. Another important component of token data structure used in context of the present invention is anchor which is like a "name value" of token and used to compute a CRC. Like Pstring, anchor string is stored in memory and pointed to by an anchor pointer embedded in the token data structure.

FIG. 1 is a high-level simplified schematic diagram of the architecture for an integrated circuit configured to enable semantic processing at inline speeds in accordance with one embodiment of the invention. Chip 146 is connected to network 100 and host 142. Incoming messages from network 100 are received into messaging block 102. Within messaging block 102, gigabit media access control (GMAC) 104a functions to receive the incoming message. In one embodiment, GMAC 104a provides functionality essentially similar to a network interface card. Logic link controller 106a processes the received message. In one embodiment, logic link controller (LLC) 106a functions as a mini Transport Control Protocol (TCP) processor. Stream characterizer block (SCB) 108 then receives the message, assigns a flow identifier if it is the beginning one and stores the message in message memory 110. Scheduler 112 takes data flows (each flow is defined as sequence of one or more related messages bounded by "begin" and "end" markers) and distributes the flows to different channels and contexts in accordance with one embodiment of the invention. As illustrated, the architecture provides four slices 114a through 114d, where each slice is divided into three channels. For example, with regard to slice zero 114a, three channels 116a through 116c are provided. In one embodiment, within each channel four contexts are provided. Thus, 48 contexts can be processed in parallel with the architecture described herein. As illustrated in the embodiment of FIG. 1, chip 146 includes five processors per slice, i.e., lexer action engine 120, three parser action engines 126, and filter action engine 136. While much of the remaining discussion regarding FIG. 1 will describe one channel, one skilled in the art will appreciate that the description for each channel may be duplicated for each slice and for each channel contained therein.

Scheduler 112 of FIG. 1 distributes the flows to the different channels according to a scheduling algorithm. In one embodiment, scheduler 112 places pieces of messages to be processed into the different contexts of each slice 114a through 114d. In each of the four slices, within a channel, one context is processed at a time thereby enabling queuing up of the data. Multipurpose Internet Mail Extensions (MIME) and regular expression (REGX) block 118 is a hardware entity that includes a lexical analyzer (a Deterministic finite automaton), a MIME boundary detector and other associated functions (like character decoder). Block 118 performs tokenizing as previously described in the above referenced co-pending applications. Lexer action engine (LAE) 120 functions as a multi-threaded processor that builds the context for hardware entities and also provides controlling functions related to tokenization. The lexical block, which includes block 118 and LAE 120, which is shared by each of the three channels of a slice, performs tokenizing operations as referred to in the above-referenced applications.

The flow of data in FIG. 1 then continues to the parse engine where a parse tree generator (PTG) 122 operates on any tokens received from LEX (118,120). The parse tree generator 122 generates production messages. Hardware action engine (HAE) 124 receives production messages from PTG 122 and performs certain primitive actions as indicated by action codes embedded in the message, one example of such a code being concatenation of lexemes, lexemes being the values of lexical tokens. Based on availability of instruction pointer in the production message, instruction pointer pointing to action code to be executed by Parser action engine (PAE), the HAE sends the incoming production message (with any local updates) to next block PAE. Parser action engine (PAE) 126 receives the output from HAE 124. PAE 126 is a multi-threaded processor in communication with data memory 128 in order to be able to compute and save any semantic data from the incoming productions messages. Regular expression (REGX) block 130 is at the disposal of PAE 126 for accelerating string match functions requiring regular expressions. It should be appreciated that the REGX blocks of the lexer and parser engines of FIG. 1, may also be referred to as deterministic finite automaton (DFA) blocks since in one embodiment, they are implemented through DFAs. It should be noted that each of the blocks of the lexer and parser engines have access to corresponding grammar tables as described in co-owned patent applications that have been incorporated by reference.

The output of PARSE block [122, 124, 126, 130] of FIG. 1 is provided to indexing and filtering engine 132, which is described further herein. Indexing and filtering engine (IFE) 132 includes XAMBALA RULE LANGUAGE (XRL)/Non-deterministic Finite Automaton (NFA) block 134 and filter action engine (FAE) block 136. As described further below the NFA block 134 is utilized for filtering messages where the queries are defined in XPATH, or other similar format types. It will be apparent to one skilled in the art that XPATH is a query language for finding information in an Extensible Mark-up Language (XML) document and is used to navigate through elements and attributes in an XML document. As illustrated in FIG. 1, FAE 136 is in communication with data memory 128. FAE 136 is a multithreaded processor that among other things, takes care of NFA state stack management. A reverse path enabling data to be transmitted back to PAE 126 of the parser engine block from FAE 136 is provided. One skilled in the art will appreciate that the reverse path provides the ability to pipeline part of filtering activity (for example those related to predicate evaluation) to the PAE. That is, data may be filtered through IFE 132 for the structural part of query and then filtered through the PAE for the predicate check part of the query so that the overall filtering speed can be enhanced. The output from IFE 132 is transmitted to messaging block 138.

Messaging block 138 includes stream de-queue (SDQ) block 140, LLC 106b, and GMAC 104b. It should be appreciated by one skilled in the art that the functionality provided by LLC 106b, and GMAC 104b of messaging block 138 on the output side of chip 146 is similar to the functionality provided by the corresponding blocks within messaging block 102 on the input side of chip 146. SDQ block 140 may also be referred to as an export engine and if the semantic data from chip 146 is transmitted to host 142, a memory deallocation for the memory space occupied by the transferred data is issued by the export engine. Message memory 110 is coupled to SDQ 140 of messaging block 138 in order to provide a bypass through the semantic processing portion of chip 146. In addition, PCI bus 144 provides for communication with external blocks to the integrated circuit described herein. Chip 146 may be integrated into a system as an add-on card, or the chip can be incorporated into an appliance. In yet another embodiment, chip 146 may be incorporated into a router. It will be apparent to one skilled in the art that chip 146 may be integrated into a communication system in numerous ways. It should be appreciated that the data coming into the embodiments described herein dictates what processing occurs, as opposed to traditional processors, which are instruction centric and which use data in an incidental way.

Figure 2:
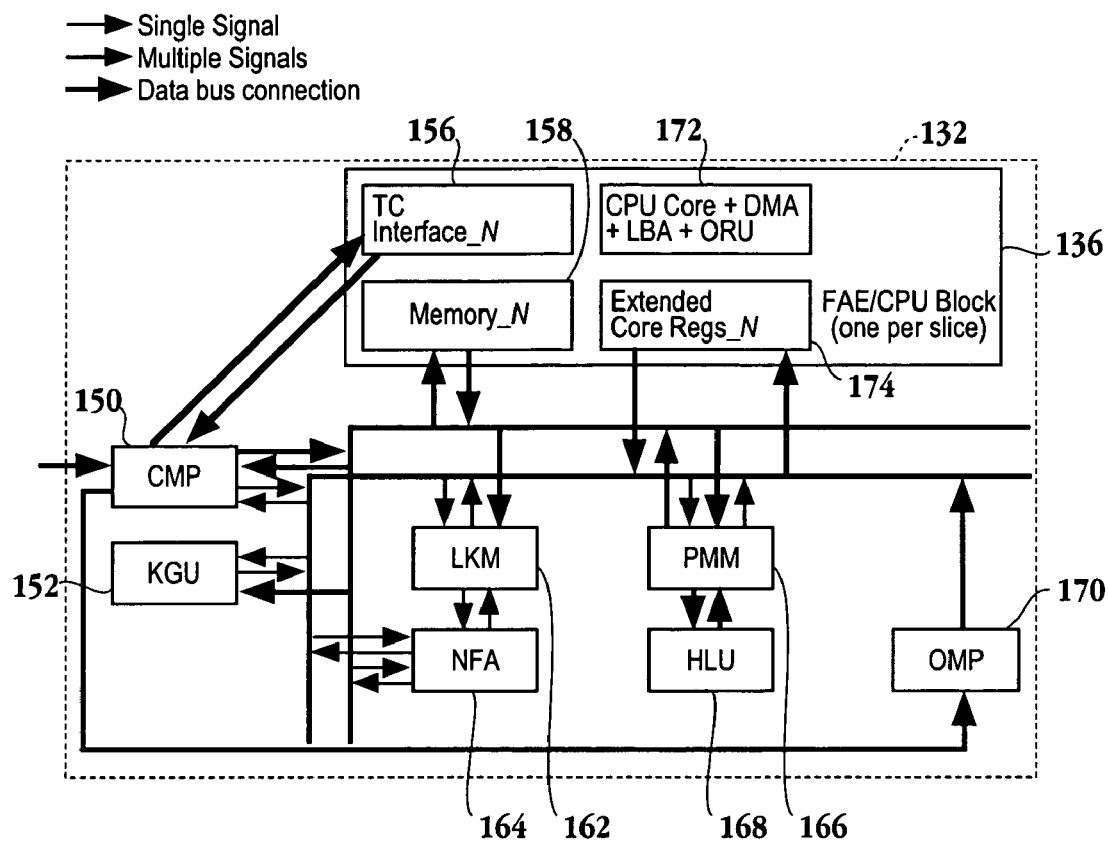
FIG. 2 is a simplified schematic diagram illustrating further details of the indexing and filtering engine in accordance with one embodiment of the invention.

FIG. 2 is a simplified schematic diagram illustrating further details of the indexing and filtering engine in accordance with one embodiment of the invention. Indexing and filtering engine 132 includes control message processor (CMP) 150 and key generation unit (KGU) 152. CMP 150 provides functionality for context management and scheduling and communicates with thread controller interface 156 of filter action engine (FAE) block 136. While CMP 150 is referred to as a processor, CMP 150 essentially functions as a hardware state machine in the embodiments described herein. As CMP 150 transfers the production token message to the FAE, KGU 152 snoops the communication and then retrieves the anchor (or token name) value from data memory 146 of FIG. 1 based on the pointer embedded in the token message. KGU 152, which is a hardware module, will generate a key from the fetched value. In one embodiment, the key is a hash value, e.g., a cyclic redundancy check (CRC), derived from the token name value. The KGU action is subject to a certain flag in token message, which indicates the requirement for key generation. It should be noted that each of the tokens are associated with respective token IDs and token values. In one embodiment, KGU 152 may store the key generated from the IDs and/or values locally. One skilled in the art should appreciate that KGU 152 is essentially self-triggered and not in need of software to trigger the KGU. However, it is possible to use software to trigger KGU 152.

IFE 132 of FIG. 2 includes FAE block 136, which is provided one for each slice with regard to FIG. 1. FAE block 136 includes thread controller interface 156, local memory 158, CPU core 172 (having associated hardware functions like Direct Memory Access-DMA, Local Buffer Agent-LBA, Output Result Update-ORU) and registers 174. It should be appreciated that thread controller interface 156 provides the context and starting instruction pointer to the core 172 as instructed by CMP 150 for the different flows. IFE 132 further includes lookup module (LKM 162) and non-deterministic finite automaton (NFA) 164. As will be described in more detail with regards to the following figures, NFA 164 functions as a structural matching engine. In one embodiment, NFA 164 is used for specific filtering mechanism when using an XPATH or XPATH-like query syntax. Further included in IFE 132 are predicate modification module (PMM) 166 and hash lookup unit (HLU) 168. PMM does certain predicate data manipulation with a view to accelerate future predicate valuation by FAE 136 or PAE 126 (FIG. 1). In one embodiment, these manipulations include changing the attribute names to indices and changing the string values of attributes to number ones if applicable. Output message processor (OMP) 170 is also included in IFE 132 and functions to get data from CMP 150/FAE 136 to send to messaging module 138 (FIG. 1) or PAE 126 (FIG. 1). OMP 170 is a simple hardware module in one embodiment.

FIG. 3A is a simplified schematic diagram illustrating the IFE module in an alternative manner to that illustrated in FIG. 2. IFE 132 includes CMP 150 and KGU 152. As described with regard to FIG. 2, CMP 150 provides a production token message, to FAE 154 and KGU 152. Before IFE 132 receives a message, NFA table block 182, which includes NFA table 184 and lookup table 186 (which may also be referred to as a hash table in one embodiment), is set up through tool 180. To understand the NFA operation, it is important to define few types of token messages. The relevant messages are known as SOD (for Start of Document), SOE (for Start of Element), EOE (for End of Element), CDATA (for character data) and EOD (for End of Document). Though these names are closely related to XML, it should be appreciated that NFA can work with tokens of any language as long as appropriate flags are set in token messages (for example SOE message should have flag to indicate that Key generation is required). In one embodiment, these token messages are constructed by the PARSER block (FIG. 1). In general the SOD indicates beginning of the message from which tokens are derived, the EOD indicates the end of the same message, the SOE marks the beginning of a message fragment corresponding to a structural hierarchy as used in XPATH like query language and the EOE marks the end of the same. CDATA in general indicates a message fragment, which corresponds to "text" as used in XPATH syntax. In one embodiment, prior to sending the data token message, the KGU is provided through context registers whether a hash based key should be generated, and what the size of the key should be (this register can get updated in response to token searches). In addition, the context registers, which are managed by CMP 150 and FAE 154, also indicate which area of the memory the hash tables are located, both for an element name and an attribute name, and where the current node is in the NFA tree. As a SOE message enters IFE module 132, the token identifier identifies that the message is a SOE message and a flag indicates if key generation is required, as mentioned above and as illustrated in Tables 1B and 1C.

Table 1A provides an exemplary structure for a specific token message coming into IFE. Tables 1B and 1C provide the exemplary data structure for a general token message.

TABLE 1A

Payload: <stockquote symbol="XMBL" price="56.98" volume="550000">
Message from PRS for above fragment of message, this would be SOE token message.

| Word | Field Definition | Comment |
|---|---|---|
| 0 | Type[7:0], [Channel[3:0], Context[3:0], Reserved[2:0], Production[12:0] | This has production token ID (in this case it is SOE), and message type and some flags. |
| 1 | FlowID[23:0], MsgFlags[7:0] | Indicating which flow it belongs to and some related flags. MsgFlags define specific attributes of token |

TABLE 1A-continued

Payload: <stockquote symbol="XMBL" price="56.98" volume="550000">
Message from PRS for above fragment of message, this would be SOE token message.

| Word | Field Definition | Comment |
|------|------------------|---------|
|  |  | (for example a flag may indicate if the token has associated semantic object defined) |
| 2 | {AnchorLen[15:0], PstringLen[15:0]} | Anchor Len indicates length of anchor of the message (here anchor is element name and length will be 10). PstringLen would be combined length of all predicates (here, predicates are same as attributes and the combined length of all attribute names and values is: 32. Note that "=" and "" are stripped off. |
| 3 | AnchorPtr[31:0] | This is the pointer (in data memory 128, FIG. 1) to the anchor which is element "stockquote" in this case. |
| 4 | PstringPtr[31:0] | This is the pointer (in data memory 128, FIG. 1) to the predicate which is attribute name "symbol" in this case. |
| 5 | MessageOffset[31:0] | This indicates the offset of this anchor in the full incoming payload message (which is stored in the message memory 110 FIG. 1). |
| 6 | TknMsgOffset | Similar to field above but as applied to decoded message (if applicable); decoding being done in LEX block, FIG. 1 |
| 7 | ProductionInfo[31:0] | ProductionInfo: {DirFlags[1:0], ReduceCount[5:0]/NumOfChildren[5:0], Depth[7:0], Reserved[7:0], PredicateNum[7:0]} PredicateNum is number of predicates (attribute name and attribute value, both count as separate predicates in this context: total 6 in this case). Other fields are not of much significance in context of NFA activity are mentioned here for the sake of completeness |

TABLE 1B

Structure of Token Message from PARSER to IFE [also known as XSNO: Xambala Standard Node Object]

| Word | 31 30 29 28 27 26 25 24 23 22 21 20 19 18 17 16 15 14 13 12 11 10 9 8 7 6 5 4 3 2 1 0 |
|---|---|
| 0 | Type         Channel     Context    PFlags         Token |
| 1 | Flow ID                                                    MsgFlags |
| 2 | AnchorLen                                                  PstringLen |
| 3 | AnchorPtr |
| 4 | PstringPtr |
| 5 | MessageOffset |
| 6 | TknMsgOffset                                               Reserved |
| 7 | ProductionInfo |

TABLE 1C

| Field | Bit(s) | Description |
|-------|--------|-------------|
| Type | 7 | If set to "0" indicates Data Message type |
|  | 6:4 | Lex Thread ID [defined between LAE and PAE only] IFE Process Code [defined between PAE and IFE] [6:4] => 000 => None (if #1 is set, send the message to OMP) 1XX => Reprocess request [#6 sets the #26 of cond register] 01X => Regular CPU processing 001 => Regular CPU processing |
|  | [3:2] | Grammar Error Count: Between PTG and PAE, => SemObj BufferType: Between PAB and PDQ |
|  | [1] | IFEControl, when '1', it means KGU should not generate key. The bit affects only when message is going from CMP to FAE. |
|  | [0] | As defined between HAE and PAE: HAE2PAEXSNO: It indicates that message from HAE to PAE is XSNO (Xambala Semantic Node Object) and not regular message coming from PTG 122, FIG. 1). As defined between IFE to SDQ: LastRuleHeader: If set to '1', it indicates that this rule header is self content and Pstring and SemObj data for any future rule header will start from a new buffer. If reset to '0', it means that there is potential associated Pstring and SemObj data in future, so the Host buffers will remain open to accommodate future Pstring and SemObj data. |

Figure 3:
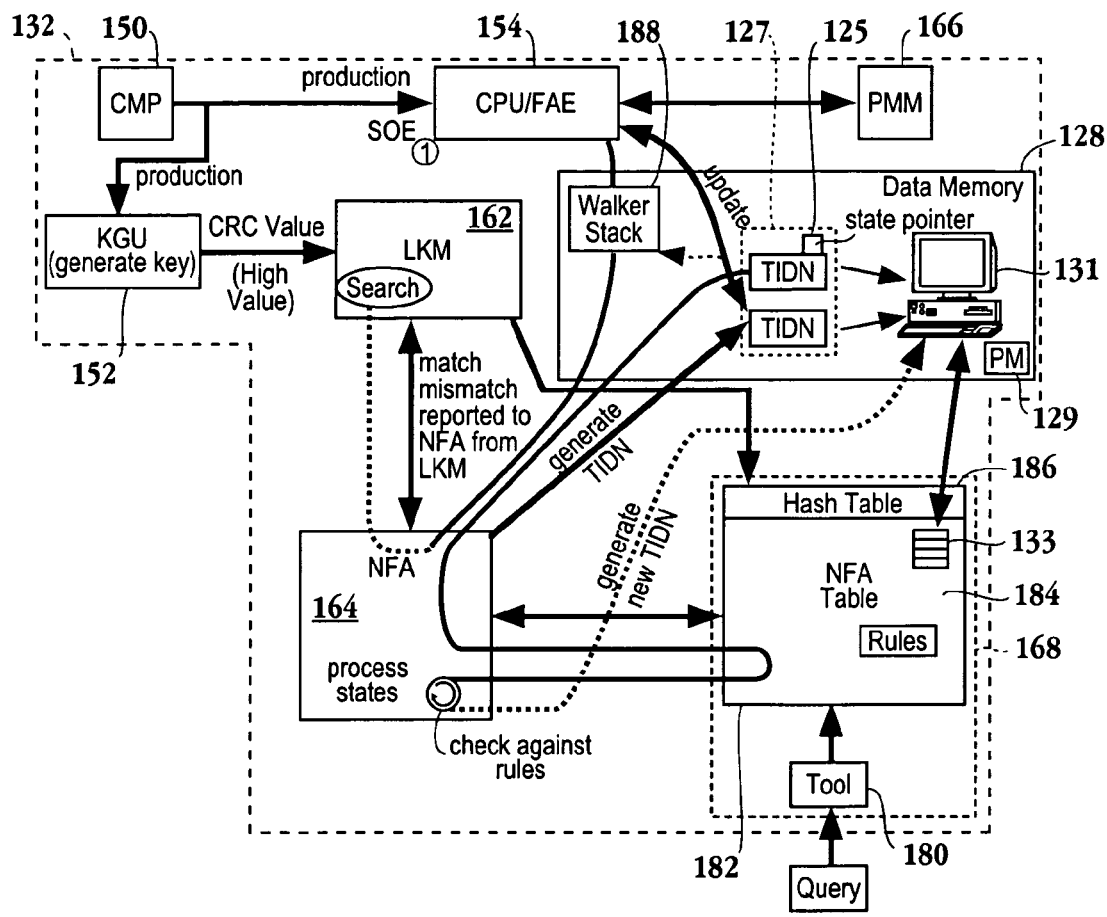
FIG. 3A is a simplified schematic diagram illustrating the IFE module in an alternative manner to that illustrated in FIG. 2.
FIG. 3B is a simplified schematic diagram illustrating the Rule Organizer tool flow in accordance with one embodiment of the invention.
Figure 11:
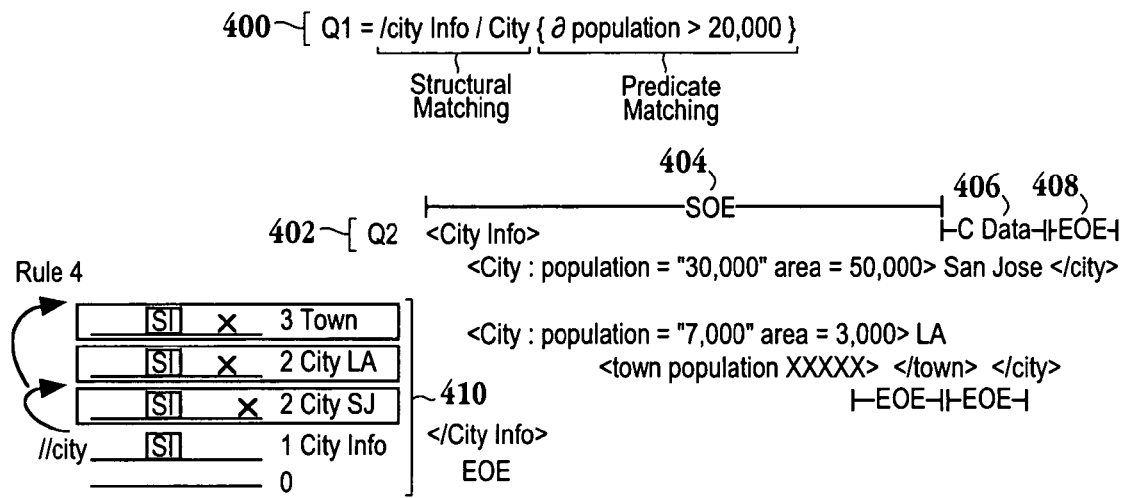
FIG. 11 is a simplified schematic of a query with XPATH type format that would utilize the non-deterministic filtering operation described herein in accordance with one embodiment of the invention.

In one embodiment, as soon as the SOE message is transferred to FAE 154 by CMP module 150, the KGU 152 triggers and starts computing the key value, which may be a cyclic redundancy check (CRC) value based on the context register (also called a search descriptor) which was already set up. One exemplary message is shown as 402 in FIG. 11. With reference to FIGS. 3 and 11, the first SOE token would have the associated element name, also known as "anchor" (see Table 1B) as "CityInfo" and KGU 152 would have computed the CRC on the element name. CMP 150 saves the token message in an input message area (IMA) of FAE 154 for the thread corresponding to the channel in use and a notification is provided to FAE 154. In one embodiment, CMP 150 functions as a context manager for IFE 132. FAE 154 triggers NFA unit 164 and later if indicated by the NFA, it also triggers PMM module 166. NFA module 164, which includes an active list processor (ALP), fetches a next Trans ID node (TIDN) from an active list in data memory 128. In one embodiment, the active list is a list of TIDNs 127 and processing each of them constitutes structural matching. As illustrated in data memory 128, each TIDN includes a state ID 131. State ID 131 includes a pointer to respective state node data 133 within NFA table 182. Further details of the TIDNs and the StateIDs and the state nodes are provided with reference to Tables 7 and 8. In one embodiment, PMM 166 receives the predicate data (attribute names and values) from local memory for processing and after processing (i.e. modifying predicates) saves the predicate data back to local memory 158, FIG. 2. While saving back the predicate data, PMM 166 has an option (specified by FAE 154) to overwrite the source data or save it in separate memory area. FAE 154, before invoking PMM 166, fetches the predicate data from predicate memory region 129 of data memory 128 to local memory 158. Predicate memory region 129 may be referred to as a predicate store or an attribute store. It may be noted that region 129 is populated by the PARSER of FIG. 1 and a pointer of the predicate string (Pstring for short) is conveyed through a field of token message (see table 1B). In another embodiment PMM 166 receives the predicate data directly from predicate memory 129 and after modifying it, saves the same back to the same memory, de-allocating any memory segment (buffer) which may have become free (due to shrinkage of data as a result of modification). Once NFA module 164 has been started by FAE 154, it triggers lookup module (LKM) 162, which has data (from the context register as mentioned earlier) detailing which area of the memory holds the hash table for the element identified by KGU 152. LKM 162 does a hash lookup, and if there is an indication of a hash collision, i.e., two element names have the same hash value, LKM 162 looks in lookup table for an exact match of the anchor string (which is saved by KGU 152 in local memory 158). LKM 162 then generates a search ready that triggers the active node processor (ANP) machine and ALP machine within NFA 164. The ANP begins checking for various rules for the current nodes that the ALP requests, as will be described in more detail below. It should be appreciated that the ALP could trigger the ANP as well, but the LKM directly indicating search completion to the ANP saves a few clocks and thus boosts the performance.

Still Referring to FIG. 3A, walker stack 188 is initiated and managed in data memory 128 by FAE 154. Walker stack 188 is a stack data structure, every level of which has a pointer to a list of TIDNs 127 and also has associated attributes of the list. The details of the generation of the list of TIDNs related to walker stack 188 are described in more detail with reference to FIGS. 5 and 10. One or more queries from a user are provided to tool 180, which compiles the queries to populate NFA table 182 and hash table 186. Tool 180 also populates a set of registers called grammar descriptors (not shown) and these registers become the source of initial values of the context registers (also known as search descriptors).

FIG. 3B is a simplified schematic diagram illustrating the Rule Organizer tool flow in accordance with one embodiment of the invention. Tool 180, which may be referred to as a rule organizer, can add a new query to existing NFA table 184/Hash table 186 or the tool can delete a query from the tables. Tool 180, in addition to receiving query file 179, also takes configuration information 181, which could be embedded as part of the query file or can be provided separately. Configuration file 181 has information on available memory size and address, certain optimization parameters, application identifier etc. An exemplary configuration file is listed below for illustrative purposes:

<RuleId_Section>
define ELEMENTNAME 257
define EPSILON 258
define STAR 259
</RuleId_Section>
<Searchbase_Descriptor_Section>
GrammarId 82
HashKeySize 7
InstructionPointer 0
LookForMsm 0

Query file 179 is the main data source for Xpath RO (also called as query compiler). The syntax is as described in the XPATH standard in this example. Block 400 FIG. 11, shows one query for illustration. It should be appreciated that XML schema file 177 and action code 183 are optional blocks and are shown for the sake of thoroughness. XML schema helps build lookup hash table 186 and the PMM hash table without knowing all queries. Likewise action codes help specify any specific action when certain structural matching (also known as structural query matching) is found. In a data driven architecture, which the IFE follows, it always helps to be available to piggyback certain software to be executed when a certain data processing event (for example structural query match in this case) happens.

Figure 4:
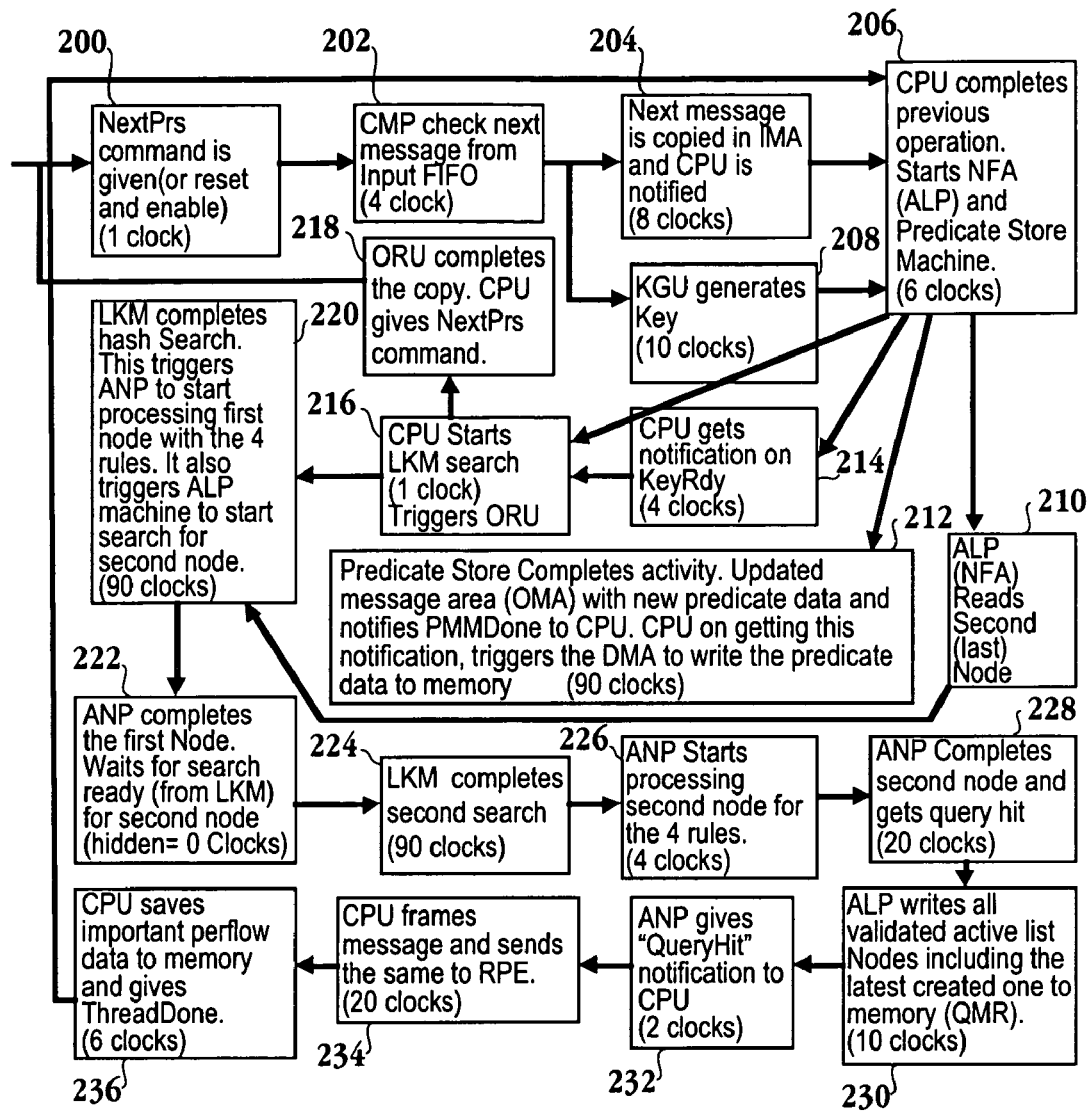
FIG. 4 is a simplified block diagram illustrating operations and events that happen in sequence for a case that assumes there are two (TransID Nodes) TIDNs and there is a query hit in a second node of processing in accordance with one embodiment of the invention.

Returning to FIG. 3A, it should be appreciated that there can be many instances of NFA table 184 and the table to be populated is decided by an application identifier and the table to be used is decided by the context registers (which are managed primarily by CMP 150 and also by CPU 154 and for which the initial value comes from a grammar descriptor, as noted earlier). With regard to NFA filtering, query 179 of FIGS. 3A and 3B will be in an XPATH or XPATH-like format. The hash value associated with the element names in query 179 (see 400 of FIG. 11) is used as address to store the search record. The search record includes a State ID (similar to state 131 of a TIDN). In addition to this, the search record has pointers for actual strings to be matched when there is a hash collision, and pointers to related search records (when specific string matches). It should be appreciated that NFA table 184 includes rules and state information. As mentioned above, KGU 152 generates a key and communicates that key to LKM 162. LKM performs a search within lookup table 186 and based on the search results, LKM 162 notifies NFA module 164 whether a hit or miss occurs. NFA module 164 will generate TransID nodes (TIDNs) and will notify FAE 154, which will update walker stack 188. It should be noted that the TIDNs represent future states for the current state, FIG. 4 is a simplified block diagram illustrating operations and events that happen in sequence for a case that assumes there are two TIDNs and there is a query hit (also called as structural query hit) in a second node of processing in accordance with one embodiment of the invention. The block diagram initiates with operation 200 where a next parse command is given (indicating that FAE is ready to accept new token in). In operation 202 the CMP checks a next message from an input FIFO. The method then proceeds to operation 204 where a next message is copied in the IMA and the CPU is notified. As used herein, the terms CPU and FAE may be used interchangeably. Contemporaneously, the KGU generates the key as described with regard to FIG. 3A for a production identified as a SOE portion of a message. In operation 206, the CPU completes previous operations and starts NFA module. In particular, after KGU has indicated that a key is ready, as shown in 214, the ALP of the NFA module is invoked as shown in 216. The predicate store machine is also invoked here (alternatively, the FAE could wait for an indication from the NFA before starting the PMM) as shown in 212. In operation 212 the PMM completes its activity and updates the memory area (local memory 158 of FIG. 2 or in data memory 128 FIG. 1) with modified predicate data. In operation 216, the CPU initiates the ALP module of the NFA, which then triggers the LKM and thereafter in operation 220 the LKM completes a token name value (anchor) search as mentioned earlier. This triggers the ANP of the NFA module to begin processing a first node (the node provided by ALP from the TIDN list, the list being picked up from a top of a walker stack, and the top of the walker stack provide to the ALP by the FAE) with the four rules, which are described in more detail below with reference to FIG. 9. Contemporaneously, the ALP is triggered to begin searching for a second node (which it does by updating the search descriptor from stateID record which it gets by fetching the record from 184 of FIG. 3A using stateID from a next TIDN of the TIDN list (also called active list)). The next TIDN is fetched from 127 FIG. 3A using a pointer from a previous TIDN and then invoking LKM 162. As illustrated in operation 218, ORU completes copying of message from IMA to output message area (OMA) and the CPU gives a next parse command. The giving of this command by the FAE (which essentially asks the CMP to get a next token message) even before the NFA has completed its activity allows some of the operations (for example key generation) to be overlapped with a current set of operation. Copying of the message from the IMA to the OMA makes sure the previous token message is not destroyed by a next token message. In operation 222, the ANP completes the first node and waits for a search ready signal from the LKM. In operation 224, the LKM completes a second search thereby triggering the ANP to start processing for the second node in operation 226. When the ANP completes a second node and gets a query hit in operation 228, the ALP writes all created TIDN lists, including the latest one, to memory in operation 230. Next, the ALP gives a query hit notification to the CPU in operation 232 and in operation 234 the CPU frames the message (by updating the content of output message area: OMA) and sends it to a reverse parsing engine (RPE). In operation 236, the CPU saves important per flow data (most importantly walker stack) to memory and provides a thread done signal, marking the completion of the full NFA based "structural matching process" related to the SOE token message.

Still referring to FIG. 4 an alternative description providing additional details, and repeating some of the previously mentioned details, of the block diagram is provided. It should be appreciated that as soon a message is read by the CMP module from the input FIFO, the key generation unit gets triggered and it starts computing the CRC (based on the context register that was already setup). The CMP module saves the message in input message area of processor (for a selected thread) and a notification is given to CPU. The CPU triggers the NFA unit and triggers the Predicate Modification machine (PMM) also. The NFA unit, in particular, the ALP machine, fetches a next TIDN from an active list. In one embodiment, the active list is a list of TIDNs and processing each of them constitutes the XPATH structural matching. The predicate modification machine receives the predicate data, i.e., attribute names and values, from local memory for processing. In one embodiment, this processing includes name to index conversion and if applicable, string value to integer/float conversion. The structural matching details of each node are further explained below. It may be noted that a first TransIDNode is waiting for execution by the ANP of the NFA. After the KGU is ready with a key, a notification that the KGU is ready goes to CPU. The CPU triggers the lookup engine. Lookup engine (also referred to as the LKM) has data about which area of the memory holds the hash table for elements. The area of memory holding the hash table is obtained from the search performed by the LKM. The LKM does the hash lookup and if there is hash collision, i.e., two element names have the same hash value, an exact match of the string is performed by the LKM. It should be noted that area for the exact match is specified in the hash table. At the end of the search, the LKM returns a "search ready" signal. The "search ready" signal triggers the ANP machine and ALP machine of the NFA. The ANP starts checking for various rules (four of them in total) for the current node that ALP requested. Exemplary rules are illustrated with regard to FIG. 12. After a first node is checked, the ALP gets a next node in. The sequence continues until all nodes in active list are processed. In the mean time, if the PMM is done (which includes writing finished data in local memory), the PMM indicates the same to the ALP machine. When both predicate modification and node processing are done, a NFADone signal is notified to CPU. In one embodiment, during the processing of the ActiveList, if there are nodes with QueryHit or PostHit (PostHit indicates that there is query hit, but the predicate expression involves CDATA also), the NFA hardware (at the end of processing), provides the "head node" pointer and count of nodes with queryHit/PostHit flags to CPU. The CPU (FAE), in turn, then sends the message to the RPE for any predicate evaluation.

It should be appreciated that for each grammar, there is a segment of the memory that is allocated as a search database. The base for this comes from a grammar based descriptor that is a register file. A given search database is further segmented under different types of token sequences and each such "token-specific search database" is segmented into two segments, i.e., "address entry segment," and "data entry segment." In an alternative embodiment, the two segments are combined, e.g., in HLU entries (used by predicate modification module—PMM) or as in NFA lookup table 186, FIG. 3A. In one embodiment, in a hash base lookup as described herein, a hash key of 16 bits or less in size is generated by the KGU. The LKM takes the programmed size of the key and does a direct lookup in this embodiment. If there is no collision, address entry/data entry is received from the memory. If there is a collision, a pointer leads to a match area where the actual value of the token (which is saved by KGU in local memory 158 FIG. 2) is compared with the value in the database. The structure of the match area depends upon the type of the token value being matched. For example in case of XML grammar, a token value being matched is typically an ASCII character string. Table 2 illustrates an exemplary hash lookup table structure used by LKM in accordance with one embodiment of the invention. Following table shows the structure of hash lookup table. In Table 2, under the "Direct String Match" section, the address entry structure used when a collision has occurred and direct comparison is required, is provided. It may be noted that a forced collision may be needed to be setup by a tool, i.e., rules organizer (setting up database), if there is possibility of a key value which may have not been considered and whose hash value may match with one of the existing hash values. In such cases, after collision there may be just one match of the exact string.

TABLE 2

| Field | Width | Location | Description |
|---|---|---|---|
| NextBase// MatchPtr[23:0] | 24 | [23:0] | Base for next search. In case of collision, this pointer points to collision resolution area (string match area). This 8 byte word address. |
| Direct Match Entry Num/ CollMatchEntryNum | 2 | 25:24 | If the next search is Direct String Match, this number provides the number of entries valid in first group (each group can have three valid entries at max). Note that even if this number is 0, the next group of address entries are read anyway (and after that this field is used to see how many entries of the group to check). If NextBase is Data (as in NFA case, without collision), [25:24] reflect the bits [25:24] of NFA StateID word 0. |
| NextSearchType | 4 | [29:26] | 3 => Search Tree Type ('0' => Sequential/Individual search, '1' => Parallel/Block (score boarding) search [2:0] => Search Type (see Register section for search type details) If NextBase is Data (as in NFA case, without collision), [29:26] reflect the bits [29:26] of NFA StateID word 0. |
| NextDataEntry | 1 | 30 | The NextBase points to Data Entry. In NFA flow, this is not used. |
| ValidBit | 1 | 31 | Marks the address entry as valid. This bit also qualifies the NextBase field. Thus if this entry is end of search, without any pointer to Address Entry, this bit should be marked as invalid (even if technically this entry has valid information) |
| Reserved | 1 | 32 | |
| Collision | 1 | 33 | If this bit is set, it indicates that there is Hash Collision and the NextBase address should be used to match the entry. If this bit is set, all search parameters would be decided by direct string match address entries. |
| ScoreWidth/ ScoreBit[4:0] | 5 | [38:34] | If next search is expected to be scoreboard type, this field will indicate the width of scoreboard register else it is not defined. A value of "00000" is taken as 32. If this search is itself scoreboard type, this field indicates the bit position [from 0 to 31] in score board to be set. It is clear that ScoreBit position will always be less than the ScoreBoard width as given by parent individual entry. Thus if parent individual entry said 5, the ScoreBit of various scoreboard address entries will be 0-4. ONLY when scoreboard is satisfied (means all bits of scoreboard of given width are set), the NextBase/NextSearchType is used. Thus in above example, only when [4:0] of scoreboard is all '1', the scoreboard is satified. It may be noted that Score Width and ScoreBoard are part of perflow data structure. If the next search type is "Scoreboard" and current one is also "scoreboard", it is assumed that "scorewidth" will be same in both cases and that would be same as given by individual addressEntry/ grammar descriptor. |
| Reserved | 23 | 61:39 | To be defined. |
| Gramarchange action | 2 | 63:62 | Reserved |

Table 3 illustrates a direct string match data structure used for resolving a hash collision by the LKM or HLU in accordance with one embodiment of the invention.

TABLE 3

| Field | Sub-Field | Width | Location | Description |
|---|---|---|---|---|
| Group Header | Starting pointer | 24 | [23:0] | Indicates the starting pointer for the P-string memory. The address is 8 byte word address. |
| | NextGrpEntryNum | 2 | 25:24 | This is the number of direct string matches required in the next group, if this group is not enough to accommodate all the strings. Note that this number should be non zero only if address entries in the this group are all full (means they are 3). If this field is zero, next group is not read. |
| | Next group pointer | 24 | [49:26] | Indicates the next group pointer. |
| Valid bit | | 1 | 50 | Indicates that the group header is valid or not. |

TABLE 3-continued

| Field | Sub-Field | Width | Location | Description |
|---|---|---|---|---|
| Reserved | | 11 | 61:51 | To be defined. |
| Gramchange action | | 2 | 63:62 | Reserved |
| AE0 | NextBase | 24 | 87:64 | Base for next search. Address is 8 byte address. |
| | Direct Match Entry Num | 2 | 89:88 | If the next search is Direct String Match/Number match, this number provides the number of entries valid in first group (each group can have three valid entries at max). If NextBase is Data (as in NFA case), [25:24] reflect the bits [25:24] of NFA StateID word 0. |
| | NextSearchType | 4 | 93:90 | 3 => Search Tree Type ('0' => Sequential/Individual search, '1' => Parallel/Block (score boarding) search [2:0] => Search Type (see Register section for search type details) If NextBase is Data (as in NFA case), [29:26] reflect the bits [29:26] of NFA StateID word 0. |
| | NextDataEntry | 1 | 94 | Not used for NFA/PMM. |
| | ValidBit | 1 | 95 | Marks the address entry as valid. This bit also qualifies the NextBase field. Thus if this entry is end of search, without any pointer to Address Entry, this bit should be marked as invalid (even if technically this entry has valid information) |
| | Reserved | 1 | 96 | |
| | Reserved | 1 | 97 | To be defined |
| | ScoreWidth/ ScoreBit[4:0] | 5 | 102:98 | If next search is expected to be scoreboard type, this field will indicate the width of scoreboard register else it is not defined. A value of "00000" is taken as 32. If this search is itself scoreboard type, this field indicates the bit position [from 0 to 31] in scoreboard to be set. It is clear that ScoreBit position will always be less than the ScoreBoard width as given by parent individual entry. Thus if parent individual entry said 5, the ScoreBit of various scoreboard address entries will be 0-4. ONLY when scoreboard is satisfied (means all bits of scoreboard of given width are set), the NextBase/ NextSearchType/ DataEntryPtr is used. Thus in above example, only when [4:0] of scoreboard is all '1', the scoreboard is satified. It may be noted that ScoreWidth and ScoreBoard are part of perflow data structure. |
| Reserved | | 2 | 104:103 | To be defined |
| | CharNum [10:0] | 11 | 115:105 | The number of characters to be compared. This is the exact length for the string to match and so if input Pstring length is different, it will not be matched. |
| | Match P-string offset | 12 | 127:116 | Offset for the match P-string location in 64 bit unit. Note that 0 characters have to be stuffed to align the actual string to 64 bit boundary. |
| AE1 | | 64 | 191:128 | The structure is same as AE0 |
| AE2 | | 64 | 255:192 | The structure is same as AE0 |

Table 4 illustrates a structure of per-flow context information for the indexing and filtering engine in accordance with one embodiment of the invention. It may be noted that walker stack information like its size and its location in memory (128, FIG. 1) is stored here. In one embodiment, the information provided by Table 4 is stored as part of a context cache.

TABLE 4

| Field Name | Field Width | Description |
| --- | --- | --- |
| Common Status Value [Rel. Loc. =0] | 16 (15:0) | These are various FLAG values that are saved on Flow basis. When a flow is restored, they write the bits of respective registers. The definition is as follows:<br>Bit Position Description<br><br>(15)     Reserved<br>(14:12)  Reserved.<br>(11)     Rule Ready (LastRule)<br>         '1' - indicate that a rule has been reached before the EOM<br>(10)     NoQDescendents: If '1', descendants are not to be sent to Host.<br>9        Reserved<br>(8)      Nullbase found<br>         '1' - indicate that a null base is found for the particular FlowID<br>(7:2)    Reserved.<br>1        Reserved (HW reset value=1)<br>0        Reserved. |
| Grammar [Rel. Loc. =2] | 16 (31:16) | The current grammar.<br>23:16 => Grammar ID<br>31:24 => Reserved.<br>This is taken from Grammar Register |
| Instruction Pointer [Rel. Loc. =4] | 32 (31:0) | Instruction pointer (8'h0, IP from GD[19:0], 4'h0}<br>[If this field is modified from the original value (which comes from GD), the same must continue till end of flow or CPU must update it after EOM, if after EOM, a fresh IP from GD is expected] |
| Current Search 1 [Rel. Loc. =8] | 32 (31:0) | Search Register1<br>[23:0] → Search Base<br>[26:24] → key size<br>[31:27] → Scoreboard Size<br>For description of fields see Grammar Descriptor Data Structure. |
| Current Search 2 [Rel. Loc. =12] | 32 (31:0) | Search Register 2<br>[1:0] → Direct Entry match Number<br>[5:2] → SearchType<br>[ 6] → No Search Update<br>[ 7] → Search ID and Then Default Search<br>[ 8] → Case Change (Lower Case Only)<br>[ 9] → Alphanumeric Only<br>[31:10] → Reserved.<br>For description of fields see Grammar Descriptor Data Structure. |
| Scoreboard [Rel. Loc. =16] | 32 (31:0) | This is the current scoreboard register in use |
| NFAStackPtr rRel. Loc. =20] | 32 | Gives base of Walker Stack for this flow<br>To be initialized with walker stack base address on SOD. |
| StackProperty [Rel. Loc. =24] | 32 | {Reserved[7:0], Reserved[7:0],PredicateNum[7:0], Depth[7:0]}<br>Reserved: To be defined<br>Depth: Depth of the production in overall message tree (element depth in case of XML): Every SOE increments it, every EOE decrements it<br>PredicateNum: Is optional based on application and used in scenario including CDATA cases.<br>To be initialized on 0 SOD. |
| TransIdBuff [Rel. Loc. 28] | 32 | Generally, this is the address of latest TransIdNode saved in main memory by NFA. This is also head of whole TransID object chain.<br>During the "Join" process (see SOE processing flow), the transIdBuff is moved to point to head of the chain.<br>When, during EOE, buffers are de-allocated, TransIDBuff is updated to point to latest (not-de-allocated) buffer. |

Table 5 provides structure for an exemplary grammar descriptor in accordance with one embodiment of the invention. It may be noted that tool 180 of FIGS. 3A and 3B builds the grammar descriptor as explained in FIG. 3B.

TABLE 5

| Field Name | Width | Location | Description |
|---|---|---|---|
| Search Base Address | 24 | 23:0 | This provides the base in the index memory. The base is aligned to 8-byte boundary. The memory space addressed is 128MB. The upper 5 bits of 32-bit address come from programmed configuration register. |
| KeySize (used as HashSize) | 3 | [26:24] | "000" => 4 bits<br>"001" => 6 bits<br>"010" => 8 bits<br>"011" => 10 bits<br>"100" => 12 bits<br>"101" => 14 bits<br>"110" => 16 bits<br>"111" => 2 bits |
| Scoreboard Size | 5 | 31:27 | If the first search type for this grammar is scoreboard one, this field provides the size of scoreboard register. A count of "00000" is treated as 32. |
| Instruction Pointer | 16 | 47:32 | This is the [23:8] of 32 bit default instruction word pointer (or [25:10] of byte instruction address) for this grammar. Note that bits [7:4] (of word address or [9:6] of byte address) come from InstrPtrLower field (see later in this table). The bits [3:0] of word address or [5:0] of byte address are filled with 0. |
| Direct Match Entry Num | 2 | 49:48 | If the search type is direct string match/ direct number match, this information indicates number of entries for direct number/string matching. Note that if the searchType is double search, this number is NOT applied towards "TokenID matching" but towards "Token Value" match. For TokenID match (in double search case), the number of entries are always taken as 3 (even if all them are invalid). |
| DefaultSearchType | 4 | 53:50 | Search type to be used. Top bit (bit 31) is used to find out if it is individual ('0') or block/ scoreboard ('1') search. Remaining three bits are interpreted as follows:<br>000 => Use the token ID as it is for direct lookup [double search does not play any role in this case]<br>001 => Use the Lexeme and hash it and do direct lookup and compare ((hash mask, compare size from table params)<br>010 => Direct lookup using token value(parameter value)<br>011 => Reserved.<br>100 => Reserved.<br>101 => Direct 24 bit number match.<br>110 => Direct string match (Number of string entries comes from field given earlier)<br>111 => Reserved |
| NoSearchUpdate | 1 | 54 | The search type and base as applicable to KGU is not going to be modified by LKM, so next token can be processed by key unit.<br>This used to be "Look4MSM" |
| Search based on Token ID followed by token value (using default search) (Double Search) [Does not apply when search type is TokenID lookup] | 1 | 55 | Indicates LKM to do the token ID search (using sequential number match) first and then value search using the default search indicated by "searchType". Here are some specific points:<br>a. From the tokenID search stage (whether search type if individual type or scoreboard), the NextBase is used for value search and nothing else (searchType, Scoreboard, DirectMatchNum, double search) is used. If however, the default search type is "tokenID" lookup, then this stage is also taken as value search and as a result all search parameters are updated from here.<br>b. If the tokenID search stage yield "DataEntry" values search is abandoned (even if the scoreboard is in progress).<br>c. If there is Data Entry Match (at the end of TID lookup), the full information is updated, though (but UpdateBase has to be true for it).<br>d. If the tokenID match does not succeed (whether individual or scoreboard), no update takes place and search continues with next token (when it comes), as if this token (which did not match) had not come at all |
| To Lower Case | 1 | 56 | Indicates KGU whether to change the case of lexeme to all lower case before computing hash. The same also applies for string match as well. |

TABLE 5-continued

| Field Name | Width | Location | Description |
| --- | --- | --- | --- |
| Alphanumeric only | 1 | 57 | Indicates the KGU whether to remove the non-alphanumeric characters from the p-Strings or not. Only the modified string is used to compute hash as well as for string comparison. |
| Reserved | 2 | 59:58 | Reserved |
| InstPtrLower | 4 | 63:60 | This is the [7:4] of 32 bit default instruction word pointer (or [9:6] of byte instruction address) for this grammar. Note that upper bits come from Instruction Pointer field. The remaining bits of the pointer are filled with 0. |

As illustrated with regard to FIG. 3A, a walker stack is utilized by NFA block 164 and is managed by CPU 154. The walker stack is a dynamic data structure. In one embodiment, each location is 64 bits (b) and out of this, 32b is a pointer pointing to a list of a TransIDNodes of a data structure (each TransIDNode is 32 bytes (B)) in size). The remaining 32b provides the related information required mainly for de-allocation purposes. It should be appreciated that the size of the walker stack is related to "document hierarchy depth." For example, for a MAX_WALKERSTACK_SIZE (typically set to 32 and thus occupying 256B of memory) location deep area located in dynamic random access memory (DRAM) (where the DRAM is read/written only once per SOE/ end of element (EOE)), an exemplary data structure is provided in Table 6. The top stack content is saved in two miscellaneous registers (part of 174 FIG. 2) in one embodiment. The stack machine uses and updates the top stack content and the CPU (where the stack machine runs) saves this content back at the end of the operation. It should be noted that the start of walker stack itself is stored in the perflow data structure and it is initialized when the first payload (FPL), which is a control message, comes in before data tokens start arriving in. In following FIG. 5W (software) implies FAE and HW (hardware) implies NFA (ALP in particular).

TABLE 6

WalkerStack: WalkerStackElem[MAX_WALKERSTACK_SIZE];
WalkerStackElem:
Flags[7:0]: WS[63:56]
ConvertCDATA: The CDATA is of type number and should be converted [comes from stateID, gets updated by HW when SOE comes in, it is used by SW when, in future CDATA event comes in]. HW sets this bit.
QueryHit: One or more of the nodes has QueryHit (it does not include the nodes which have just HasQParent). HW sets/Resets this bit.
NoNFAHit: For this SOE event there was no rule hit out of any target node processing. This is a dead-end of this element branch. HW sets this bit.
ChildQueryHit: There is at least one node in this branch which has a child (or grand child with QueryHit). This bit is set and used by software (SW).
OnlyNode: There is only one node in associated list. HW sets this bit.
HasQparent: Set and used by SW only. It is set (in target list walker stack) when SOE processing (of active list) comes with QueryHit or the active list walker stack has HasQParent set.
Processed: This node has been processed. Set by SW and used by SW. In case of SOE, it can be used not to send a message to RPE. In case of EOE, it can be used not to de-allocate (since these are not temp node anymore).

TABLE 6-continued

Reserved: To be defined
NodeQInfo[23:0]: WS[55:32]: This is set and used by SW. It has following meaning: {23:16: Reserved,
[15:8] => NewNodeCount[7:0] (count of all new nodes created during SOE processing)
[7:0] => QueryCount[7:0] (Indicates how many nodes (starting from HeadNode) have QueryHit or HasQParent in them. NFA provides this data to CPU along with NFADone flag, after SOE has been processed.)
TransIDHead[31:0]: WS[31:0]: The pointer to first element of the TransIDNode list connected to this walker stack}. HW updates it.

Figure 5:
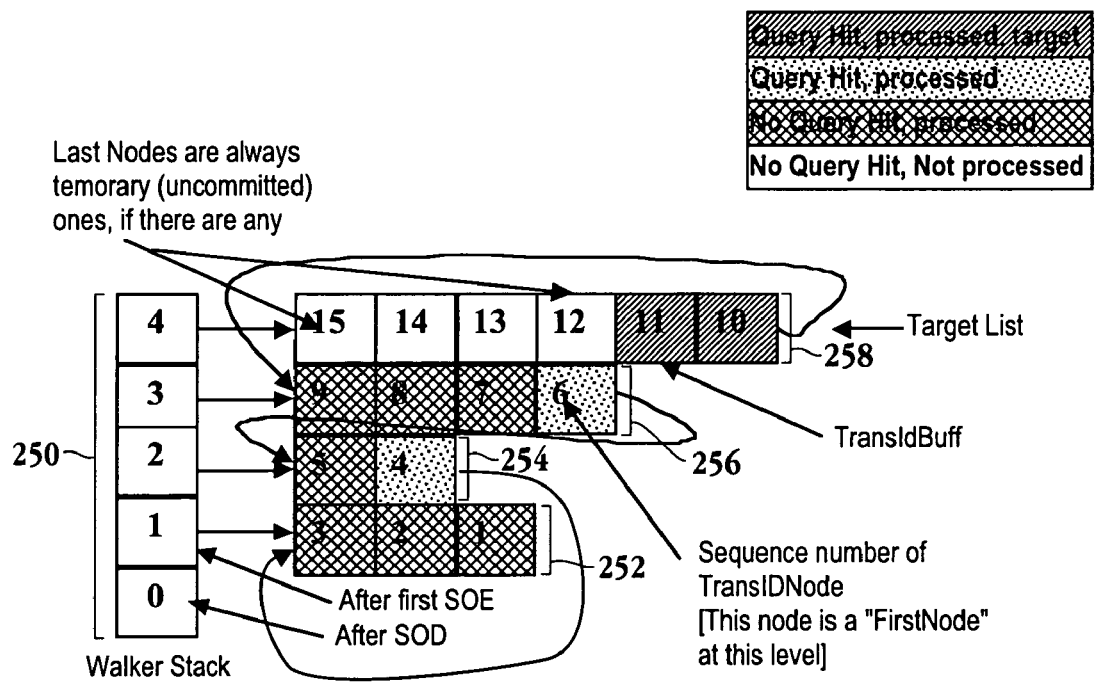
FIG. 5 illustrates an exemplary walker stack and connectivity of TIDNs in accordance with one embodiment of the invention.

FIG. 5 illustrates an exemplary walker stack and connectivity of TIDNs in accordance with one embodiment of the invention. Walker stack 250 is depicted as having five levels with level 0 initiated after receiving a start of document (SOD) message portion, level 1 initiated after receiving a first SOE message portion, and so on. Associated with the various levels of walker stack 250 are sequence numbers corresponding to TIDNs. That is, level 1 of walker stack 250 is associated with sequence numbers 1-3 of level 252 for respective TIDNs. As illustrated, the TIDNs associated with sequence numbers 1-3 have been labeled as no query hit, processed. Levels 2, 3, and 4 of walker stack 250 are associated with the sequence numbers of levels 254, 256, and 258, respectively. The target list of TIDNs (level 258) is on the a top level of the TIDN stack and further details on the generation of the target list (a list of TIDNs created after processing TIDNs of active list are called target list) is provided with reference to FIG. 10. As illustrated in the target list, the last nodes, 12-15, are temporary (in the sense that they do not have any query hit and there is possibility that they may not have children nodes either) in one embodiment. Furthermore, the lines connecting a first node at one level and a last node at the next lower level demonstrate that these nodes are linked. It should be noted that the nodes shown in same level are linked from left to right. It should also be appreciated that this linking is used by export engine (140, FIG. 1) for constructing semantic data objects and also by the NFA (for data linearization or offset conversion)

Table 7 provides exemplary structure for transID nodes (TIDNs) in accordance with one embodiment of the invention. It should be noted that the "ID" (StateIDWord) below provides an index to a global State Node array also called NFA table 184 (FIG. 3A).

TABLE 7

| Word No. | Name | Description |
| --- | --- | --- |
| W0 | nextPtr | This points to next TransIDNode in chain. This is used for two purposes: Traversing the chain, while processing "active list" by NFA HW and De-queuing the same to Host on command by PDQ. |

TABLE 7-continued

| Word No. | Name | Description |
|---|---|---|
| W1 | Header | In one embodiment only top 27 bits indicate the pointer. The bottom 5 bits indicate buffer occupany (as used for buffer management) and that is always 0x18. The full definition is as follows:<br>[31:5] => NextPtr in unit of 32B<br>[4:0]=> Buffer occupancy=0x18 (fixed for TransIDNode data structure)<br>This is part of buffer management as well as of functional use. Following is the description of the same:<br>[15:0] => Length= 0x18 [indicates 24 char content in 32B buffer]<br>[23:16] => NodeFlagsA (see details below)<br>[30:24] => NodeFlags (see details below)<br>[31] => '1' [Marks as BEGIN and used for buffer management]<br>NodeFlagsA (additional Node Flags):<br>[0] => VerifiedQParent [used while checking for HasQParent flag]<br>[7:1] => Reserved<br>NodeFlags: (0= maps to [24] )<br>[0] => HasQParent [Its parent or grand parent has a query hit]<br>[1] => Processed [This node is processed, during SOE processing, skip it and all following nodes]. RESERVED CURRENTLY.<br>[2] => FirstNode [This was the first Node added on this walker stack]<br>[3] => QueryHit [includes cases where PostHit is there]<br>[4] => R0Node [There is no rule hit, this node is to carry element store]<br>[5] => PostHit [the corresponding State is dependent on CDATA: HW does not update it]<br>[6] => HasQChild (set by SW to indicate that this node has child or grand child with QueryHit) |
| W2 | StateIDWord | This is the first 32 bits of stateNode. The StateNode data structure is further defined inTable 8. |
| W3 | PrevNode | This is the related offset/ptr of the prevNode (in full linear storage of all TransID saved nodes). The offset starts at 0 from start of the flow. If the TransID node is expected to be consumed within chip (e.g., via PAE), it would be a pointer. |
| W4 | ElementSize | Also known as PredicatesSize. Indicates the size of all data stored as part production (like SQE) definition (attributes and optionally CDATA |
| W5 | ElementStore | This is relative offset/Pointer of element store (for this production). The offset starts at 0 from start of the flow. If the data is expected to be consumed within the chip (e.g., by the PAE, a pointer is stored instead). |
| W6 | ThisNode/ FirstChild/ QueryID | Relative offset/Ptr of this node (does not play much role when pointers are used). While creating a DOM tree, this field can be used to indicate the offset/ Pointer of the first child (among various siblings). Likewise while the message is being sent from IFE to RPE, this field is also used as a query identifier (QID). |
| W7 | ProductionInfo | Details about production, which could be used to create DOM tree or doing NFA for general parser tree (as opposed to XML parse tree). Following is the definition:<br>ProductionInfo: {DirFlags[1:0] , ReduceCount[5:0]/NumOfChildren[5:0], Depth[7:0], Reserved[7:0], PredicateNum[7:0]} |

Table 8 provides an exemplary structure of a state node from NFA table in accordance with one embodiment of the invention. It should be appreciated that the rule organizer after processing the queries, prepares an array of "StateNodes." Each state node is 32B of size and is indexed by a 24 bit ID (identifier). The content of the structure of each state node assists in driving the NFA. In one embodiment, this data is in static random access memory (SRAM) as the data is frequently accessed. A cache on the chip exists for this memory in one embodiment. In another embodiment, the NFA machine always prefetches the next state node (at the end of previous search) and gets the content (first 16B) in local flow memory.

TABLE 8

| Word No. | Name | Description |
|---|---|---|
| W0 | StateIDWord | This is the main (element match based) state ID word. The Details of this word are as follows:<br>23:0 => StateID<br>24=> processPredicates (Overall qualifier for predicate modification)<br>25=> Reserved<br>26 => HasQuery (A flag indicating that there is query here, also includes cases where PostHit is there)<br>27=> PostHit (There is CDATA dependency and so the predicate evaluation should be postponed or should be continued) |

TABLE 8-continued

| Word No. | Name | Description |
|---|---|---|
| | | 28=> ConvertCData (CDATA is of number type and should be converted)<br>29=> Type (EPS type if 1)<br>31:30: Reserved |
| W1 | StarStateIDWord | This is the stateID to see if there is * rule (rule 2) match:<br>23:0 => StateID (for rule 2 or star rule)<br>24=> processPredicates (Overall qualifier for predicate modification)<br>25=> processValues (Overall qualifier for value modification)<br>26 => HasQuery (A flag indicating that there is query here)<br>27=> PostHit (There is CDATA dependency and so the predicate evaluation should be postponed or should be continued)<br>28=> ConvertCData (CDATA is of number type and should be converted)<br>29=> Type (EPS type if 1)<br>31:30: Reserved |
| W2 | EpsilonStateIDWord | This is stateID, used to see if there is Epsilon (rule 4) hit.<br>23:0 => StateID<br>31:24=> Reserved |
| W3 | HashTblPtr | 23:0 => This is pointer to next hash table lookup, the unit is 8B<br>26:24 => hashSize [see below]<br>31:27=> Reserved [0]<br>"000" => 4 bits<br>"001" => 6 bits<br>"010" => 8 bits<br>"011" => 10 bits<br>"100" => 12 bits<br>"101" => 14 bits<br>"110" => 16 bits<br>"111" => 2 bits |
| W4 | QIDIndex | If HashQuery flag is true, this field gives actual QueryID (it could indicate an array of queries as well). See the structure below. |
| W5 | Cflags | Each bit at position N in this word (N=0 means LSb), indicates that Nth attribute (0th attribute is the one which has index 0), has to be converted to BCD float notation. |
| W6 | Parent | Indicates the parent of this state node (used for state node maintenance) |
| W7 | TransCnt | Used by SW to manage the state ID node |

Figure 6:
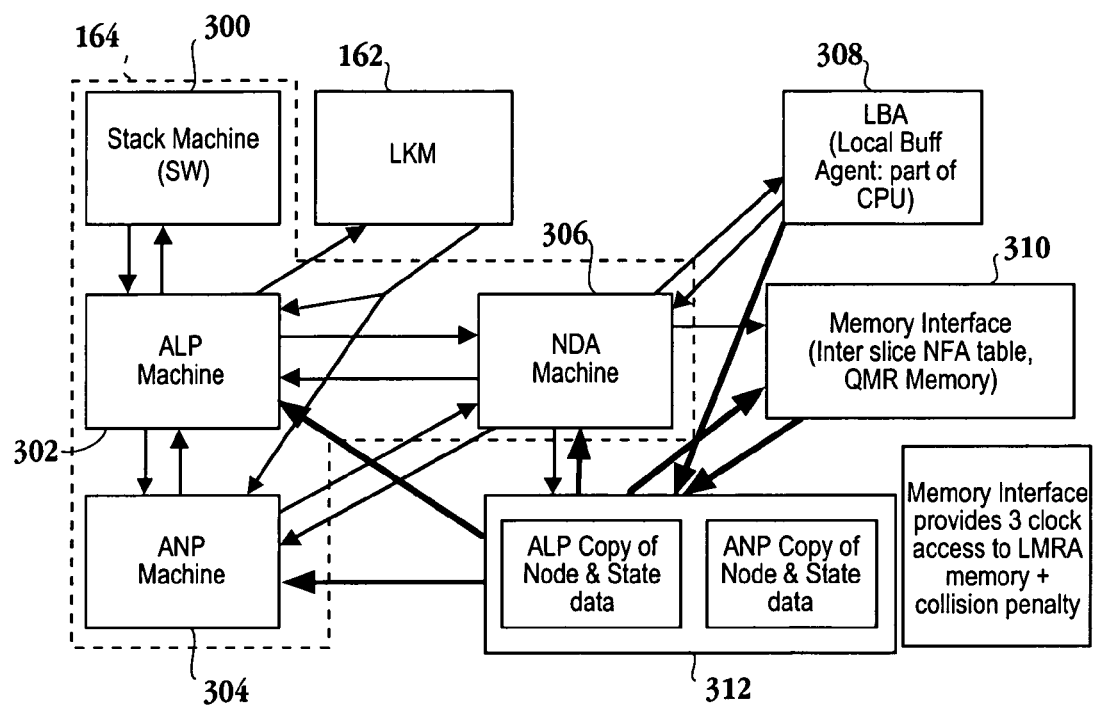
FIG. 6 is a simplified schematic diagram illustrating the main components of the non-deterministic finite automaton module in accordance with one embodiment of the invention.

FIG. 6 is a simplified schematic diagram illustrating the main components of the non-deterministic finite automaton module in accordance with one embodiment of the invention. NFA module 164 includes four main components, stack machine 300, node data access (NDA) machine 306, active list processor (ALP) 302 and active node processor (ANP) 304. Stack control machine 300 functions to take care of initializing, pushing and popping stacks. In one embodiment this machine runs on the FAE, which is an ARC™ core, however, this is not meant to be limiting as any suitable configurable core may be used. Also the stack machine can be implemented in hardware as well. Node data access machine 306 fetches relevant data of the TIDNs and state nodes in a set of registers. Additionally, node data access machine 306 allocates buffer memory and writes a new TIDN to memory. It should be appreciated that node data access machine 306 is triggered by ALP machine 302 and ANP machine 304. As mentioned earlier, ALP takes care of processing complete active list of TIDN. Processing of each TIDN of the list is done by ANP machine 304 as described in more details later. The job of ALP machine 302 is to provide the starting data of TIDNs and StateID and then let ANP 304 perform as described below. The TIDN/StateID data is retrieved by NDA machine 306 (at the instance of the ALP module).

ALP machine 302 of FIG. 6 also works when "NFADeAllocate" command from CPU comes. In this case, the NFA picks up one by one TIDN (starting with head one from walker stack) all the way to the one with "FirstNode" flag and asks NDA machine to de-allocate the nodes which have no QueryHit (with or without PostHit). ALP 302 also sends the Query hit indication to CPU, if there are nodes with QueryHit or PostHit. The actual buffer de-allocation request goes to local buffer agent (LBA) 308 (which is part FAE 172, FIG. 2). ANP machine 304 executes the various matching rules. This machine is triggered by ALP machine 302 and completes when all rules and recursions of the given TIDN is processed. During this processing, ANP 304 calls on Node Data Access machine 306 to get the relevant data, e.g., from block 310, and also to write back the target node list. As illustrated, ALP 302 and ANP 304 communicate with LKM 162. It should be appreciated that ANP 304 processes a single node/element at a time as provided by ALP 302.

Still referring to FIG. 6, stack machine 300 performs three main functions: 1) Initialize Stack (on SOD event); 2) create a first TransID node on the start of document (SOD); 3) Push (to stack on SOE or other applicable production) and Pop (from stack on EOE or other applicable productions). Stack machine 300 is part of CPU code and there is no hardware implementation in one embodiment. The software/hardware interface is through a set of miscellaneous registers (174, FIG. 2) and perflow context registers e.g., see Table 4. Upon a SOD event, the CPU code allocates memory for the stack area and the puts the address of first ($0^{th}$) location into StackTop register [which is part of perflow area]. This area [$0^{th}$ location] has the address of "first" or root TIDN and corresponds to the SOD. The root node is also created by software, which allocates one buffer and initializes the allocated buffer. If needed, stack machine 300 also updates Search Registers (if that is not the same as is initialized in grammar descriptor for that grammar). Upon a SOE event, the hardware puts the address of the first (also called head) TIDN of the target list into memory pointed by StackTop+4 address and sets NFADone bit in a condition register (one of the registers of 174, FIG. 2). The CPU then increments the StackTop register. The CPU also decides (after completing a stack processing), if the number of "accumulated nodes" has crossed some threshold. If that is the case, the CPU can create a message and send it to the Host (with appropriate flag indicating, no processing).

If the flag (in walker stack structure) NoNFAHit is set, the stack machine does not invoke NFA hardware on SOE and instead pushes another entry with pointer to R0Node (which is discussed further below) with a NoNFAHit bit set. When processing of an active list by NFA 164 yields no TIDN, a dummy TIDN is created (by HW itself in one embodiment). This node is called R0Node (R0 to indicate no rule hit). While NFA 164 is processing an active list and NFA 164 encounters such a situation (ALPNoRuleHit), the NFA automatically creates the R0Node (in main memory 128 FIG. 1). However, in case of a next SOE, when there is no active list to be processed as such, the CPU is supposed to get such a node and write the predicate store pointer (or offset as the case may be) without invoking NFA 164. Stack Machine 300 may also compute certain production properties: These production properties include: 1) Depth computation: On SOD, make Depth (of stack) as 0, On every SOE increments "Depth" and on every EOE decrement "Depth." This is essentially an index of stackTOP. 2) No. of Children Update (if help is needed for DOM tree creation): When EOE comes, go to Top node from walker stack (before POP) and update the "ReduceCount" field (which is part of ProductionInfo word) with the data from incoming token message's ReduceCount field (again of ProductionInfo word).

Continuing with FIG. 6, NDA machine 306 performs four types of activities: Read, Write, Update and Specific functions. For a read activity, NDA 306 fetches TIDN and/or state ID structure (only relevant portions) to local registers for the use of ANP 304/ALP 302 state machines. The trigger to NDA 300 comes from ANP 304, as well as from ALP 302. For the "write" action, NDA 306 gets a new pointer (32B buffer) from the LBA module and writes the TIDN data into memory. The "write" action is invoked when a new node has to be added to the target list (with or without query hit). During the update process, certain fields (for example NextPtr) of TIDN are modified. Specific functions include those functions that are executed by the NDA machine 306 on demand from ALP 302. Most of these actions are memory intensive operations (read, scan and update) and that is why they are delegated to NDA machine 300 by ALP 302. As illustrated, NDA machine 306 communicates with memory interface 310 to access inter slice NFA table and Data memory (127 FIG. 3A).

Figure 7:
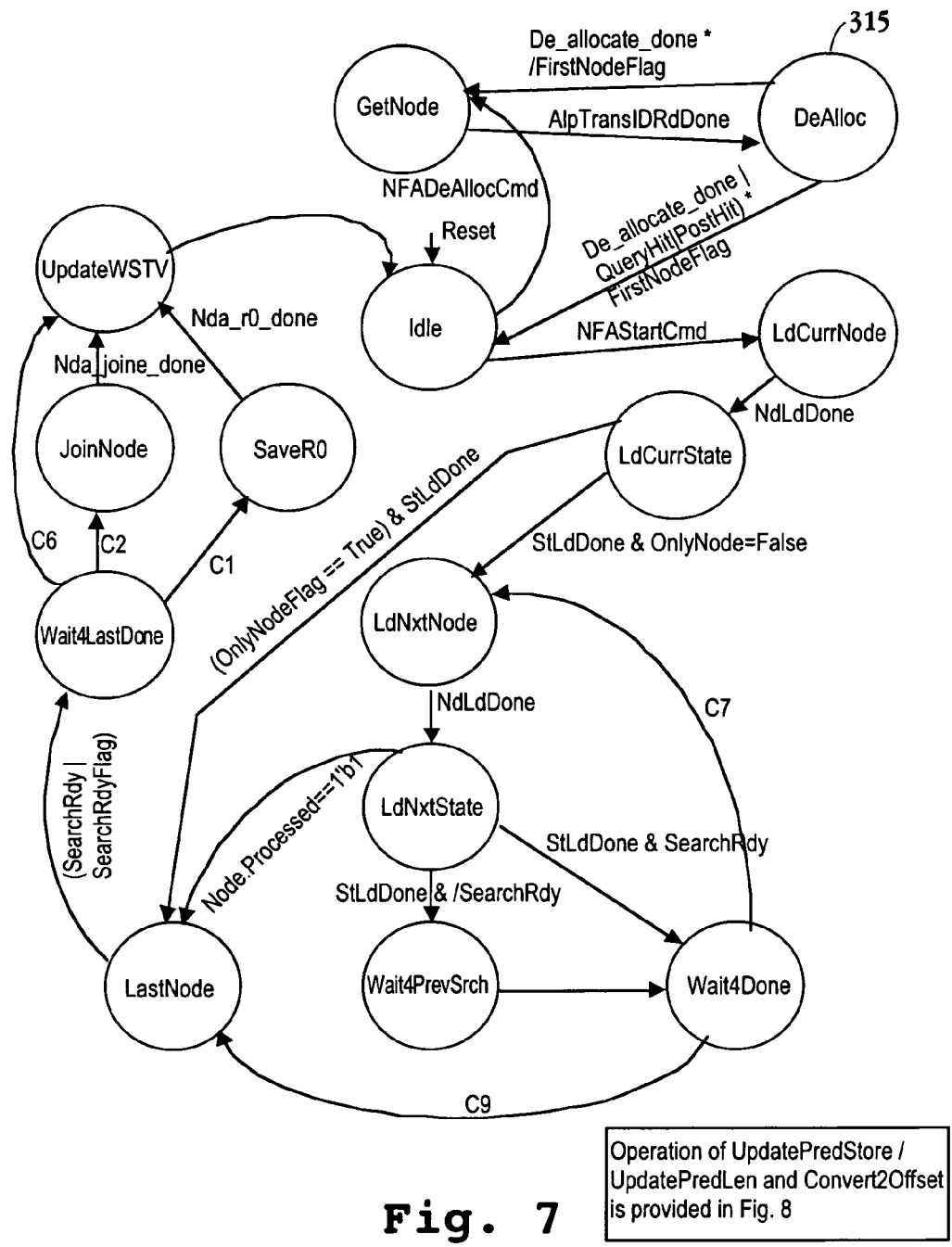
FIGS. 7 and 8 provide a state diagram showing the states for the active list processor in accordance with one embodiment of the invention.
Figure 8:
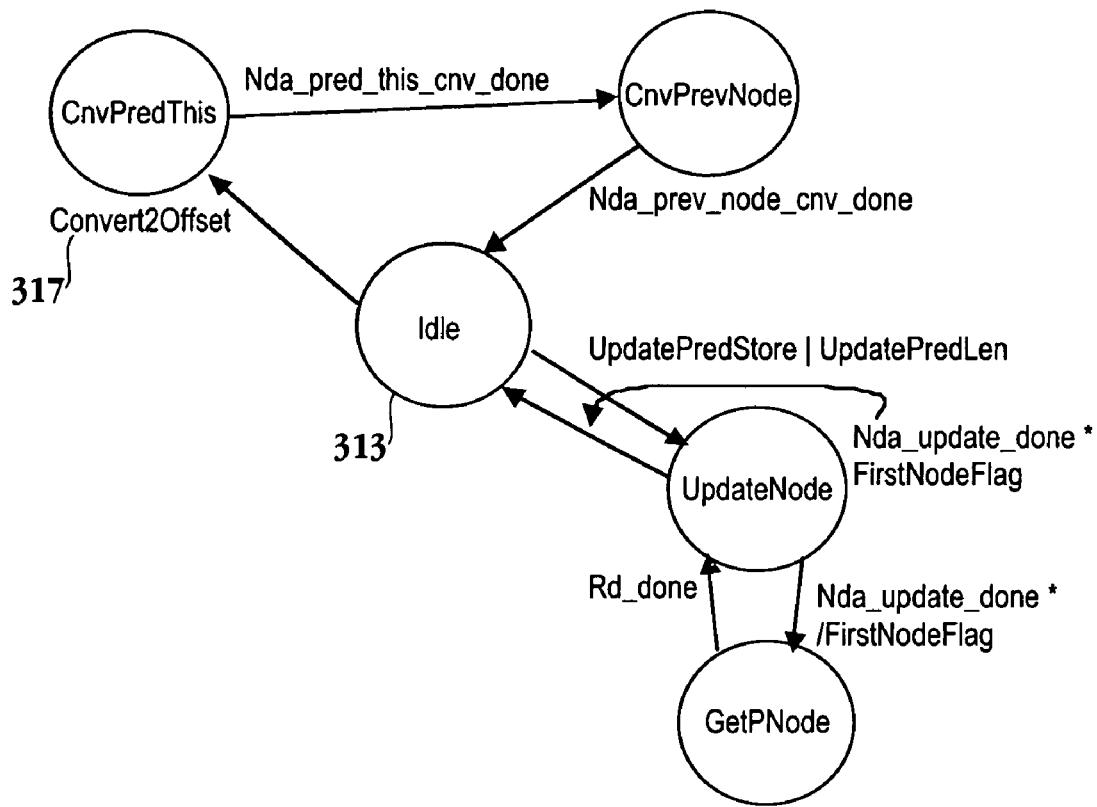

FIGS. 7 and 8 provide a state diagram showing the states for the active list processor in accordance with one embodiment of the invention. The ALP is the main control module and gets triggered by the CPU. There are four types of triggers that come to the ALP from the CPU in one embodiment. One trigger (NFAStart) comes when SOE or equivalent event has to be processed. A second type of trigger (NFADeAllocate) comes when EOE or equivalent event has to be processed. The hardware is invoked if a node list has not been used as "active list" and EOE comes (which means "Processed" flag in walker stack is false). A third type of trigger comes when the CPU wants "addition" of "Delayed Predicate" like CDATA to predicate store (also referred to as element store or attribute store in various contexts) and update of the fields of TransIDNodes which are pointing to the same. This is done via command "UpdatePredStore." A fourth trigger, which is similar to the third one, comes when the NFA has completed processing of the active list and the PMM has completed the predicate change (and so there is change in total element store size). The command is called "UpdatePredLen." This command causes the update of ElementSize field of target list (created during previous processing) nodes. Once triggered, the command keeps on running by itself until the desired action completes. The CPU triggers with NFAStart after the CPU detects a data token (like a SOE) which requires NFA processing. After that, the ALP machine waits for the hash search to complete and then proceeds with further processing. The ALP machine copies the TIDN and StateID structure to the ANP and the ANP gets started. The ANP completes processing of one node and then the ALP gives the ANP a next TIDN (and corresponding initial StateID) data. As soon as the ANP has started, the ALP starts a hash check for the current token with respect to next Hash Ptr (from new StateID of next TransIDNode). This allows the parallel operation of the ALP and the ANP to maximum extent. If there is query hit the ALP machine counts the number of hits (and provides the same to CPU along with QueryHit condition bit, at the end of list). The ALP machine continues the processing until the node having "FirstNode" Flag is found (which is taken as the last node). In case of NFADeAllocate, (see state 315 of FIG. 7) the ALP machine again traverses all TIDNs (starting with the head pointer from walker stack) all the way to one having "FirstNode" Flag and requests de-allocation of those which do not have QueryHit/HasQParent flags set. It may be noted that HasQParent indicates that even though this node does not have query hit, its ancestor(s) do have a query hit. These flags comes in handy when end application wants the entire portion of document which constitutes sub hierarchy of an element node with query hit. This is a very powerful aspect. The same effect (of getting all of the sub hierarchy could be achieved by adding a query like "HitNode//*", where HitNode is the element which is being sought after. Such a query is very expensive in terms of memory usage as well as processing time. The flag "NoQDescendents" (see table 4) is reset by FAE if this is desired and ANP hardware takes care of setting of HasQParent flag in TIDN. The actual buffer de-allocation request goes to the LBA module. In case of "UpdatePredStore" command, the ALP machine again traverses all TIDNs (starting from the head pointer from the walker stack) all the way to one having "FirstNode" flag set. The ALP also corrects the "ElementSize" field (in TIDNs). In case of "UpdatePredLen" command, the ALP machine again traverses all TIDNs (starting from the pointer given to it by the CPU from the walker stack) all the way to one having "FirstNode" flag set. The ALP corrects the "ElementSize" field (in TIDNs) with the final length, which has been initialized by the PMM or by the CPU. The AlpNoRuleHit flag indicates that there was no rule hit at all while processing the target list so far. As noted between state 313 and 317 of FIG. 8, a Convert2Offset function is provided. It should be appreciated that the data linearization process performed by the Convert2Offset function will convert a pointer to an offset value. Thus, when data is transferred from the semantic processor defined herein to another processor (say Host 142 in FIG. 1) the offset value is available since the pointer would be meaningless to the other system. Table 9 illustrates the legends provided within the state diagrams of FIGS. 7 and 8.

TABLE 9

Condition Legends: AnpSm implies ANP State Machine state and AlpSm implies ALP state machine state

| | |
|---|---|
| C1 | (AnpSm== Idle) & (PsmSm== Done) & ANPNoRuleHit |
| C2 | (AnpSm== Idle) & (PsmSm== Done) & /ANPNoRuleHit * TempTransIDNodeCreated |
| C6 | (AnpSm== Idle) & (PsmSm== Done) & /ANPNoRuleHit * /TempTransIDNodeCreated |
| C7 | (AnpSm== Idle) & (FirstNode == False) |
| C9 | (AnpSm== Idle) & (FirstNode== True) |

State Operations

| | |
|---|---|
| Do_idle | Set ALPNoRuleHit flag. Update the nextPtr field of TransIDNode of ALP copy) from perflow data structure. Clear QueryHitCount (Misc Register). Note that CPUNAFStartCmd comes after CPU gets Data token and finds that proper production ID like SOE is there). Also, the perflow hardware makes sure that search registers are already up-to-date with value to be used for SOE search. While exiting to UpdateNode state, get the value of TransIdHead value in local register for use of the UpdateNode state. Also (while exiting to UpdateNode state) get the {PredStore, 5'b0} value in another local register for us of UpdateNode and other states and likewise get the size and pointer of the new token from Misc Reg area. |
| Do_LdCurrNode | Pass the TransIDNode ptr from Stack Top register to NDA and ask for loading it to ALP copy of node registers (by asserting alp_tid_rd_req). Wait for AlpTransIDRdDone signal from NDA machine. |
| Do_LdCurrState | Pass the StateID address (as received from TransIDNode area) to NDA machine and ask it to load the state node structure (only first 16B) to ALP copy (assert a pulse wide signal alp_sid_rd_req for it). Wait for AlpStateRdDone signal from NDA. While exiting this state: Trigger the LKM machine to start search (a pulse). Trigger the copy operation of TransID and StateID data from ALP to ANP area. The OnlyNode Fla is part of Stack To register. |
| Do_LdNxtNode | If the "FirstNode" is not True, load the transID node structure (Active List one). For this generate the alp_tid_rd_req to NDA machine and wait for AlpTransIDRdDone signal. Set SearchRdy flag on SearchRdy signal. |
| Do_LdNxtState | If "Processed" bit of the node is not set to '1' (else exit): Load the State structure (Active List one). For this, generate the alp_sid_rd_req to NDA machine and wait for AlpStateRdDone signal. Set SearchRdy flag on searchRdy signal, if not LdStDone. Clear SearchRdy flag if LdStDone is true. LdStDone is a pulse which is generated when last data of the state structure is about to get written (in next clock). Also while exiting the state, NodeID and StateID data is transferred from ALP (in one clock) copy to ANP. |
| Do_Wait4PrevSrch | While existing the state, NodeID and StateID data is transferred from ALP copy to ANP (in one clock). |
| Do_Wait4Done | While entering the state, if the NextNodePtr (of the Active List node) is not NULL, Start the search (LKMSearch). In the state, if the searchRdy comes, set the SearchRdy flag. If ANPNoRuleHit is reset, reset ALPNoRuleHit. While existing, set the flag ANPNoRuleHit and if there is QueryHit in the active List node (which was being processed by ANP), increment QueryHit counter. |
| Do_LastNode | Clear SearchRdy flag. Once the ANP machine goes to IDLE, the Node and StateID data is transferred from ALP copy to ANP (this happens in one clock). |
| Do_Wait4LastDone | Also update the "Search Registers" with data from ANP copy. This data will eventually get saved in perflow data structure. While exiting, if ANPNoRuleHit is reset, reset ALPNoRuleHit flag and if there is QueryHit/PostHit in the active List node (which was being processed by ANP), increment QueryHit counter. |
| Do_GetNode | Pick NodePtr from Stack Top registers. If the NodePtr is not NULL, load the transID node structure. For this generate the alp_tid_rd_req to NDA machine and wait for AlpTransIDRdDone signal. If NodePtr is NULL, generate ERROR "NullNodeAllocReguest" signal. |
| Do_DeAlloc | If QueryHit/ HasQPparent flags are off, de-allocate the TransID pointer (it is in ALP copy). Send the de-allocate request to LBA. Keep on counting the nodes with QuerHit. Also remember the firstNode with QueryHit. This information has to go to CPU. |
| Do_joinNode | Generate request "alp_join_nodes" (pulse) to NDA machine. Exit on "nda_joined" signal from NDA module. |
| Do_UpdateWSTV | This state is used to update walker stack top value. Write into "NextStackTop" register (part of perflow register set) following value: NextStackTop= (TempTransIdNodeCreated== '1')? TempTransIDBuff: (AlpNoRuleHit== '1') ? {NoNFAHit, TransIdBuff} : TransIdBuff) Unconditionally go to Idle from here. Generate signal NFADone condition signal. If QueryHit counter is non zero, generate IndexRdy (QueryHit) condition too. |

TABLE 9-continued

Condition Legends: AnpSm implies ANP State Machine state and AlpSm implies ALP state machine state

| | |
|---|---|
| Do_SaveR0 | Generate signal alp_save_r0 signal (pulse). Once nda_r0_saved signal comes back, go to UpdateWSTV. |
| Do_UpdateNode | While entering in this state, the machine gives the signal alp_node_pred_update to NDA, while providing the address (the address is either TransIDHead as it came from stack (when machine came from Idle state) or it came from NextPtr which was copied in state GetPNode). A flag "alp_PredLenOnly" is also provided to NDA. The machine waits for nda_update_done. The modification data (NewPredLen, which was copied locally when machine came from IDLE state) is also made available to NDA machine.<br>If this is the last node in list (node with FirstNode flag set), after update is over, while exiting, generate signal NFADone condition signal |
| Do_GetPNode | In this state the state machine simply copies the pointer (which NextPtr field of TransIDNode). This is one clock state. |
| Do_CnvPredThis | Provide TransIdBuff (from Perflow register) as address to NDA machine and send signal alp_cnv_pred_this (pulse type). |
| Do_CnvPrevNode | Provide TransIdBuff (from Perflow register) as address to NDA machine and send signal alp_cnv_prev_node (pulse type). |

Figure 9:
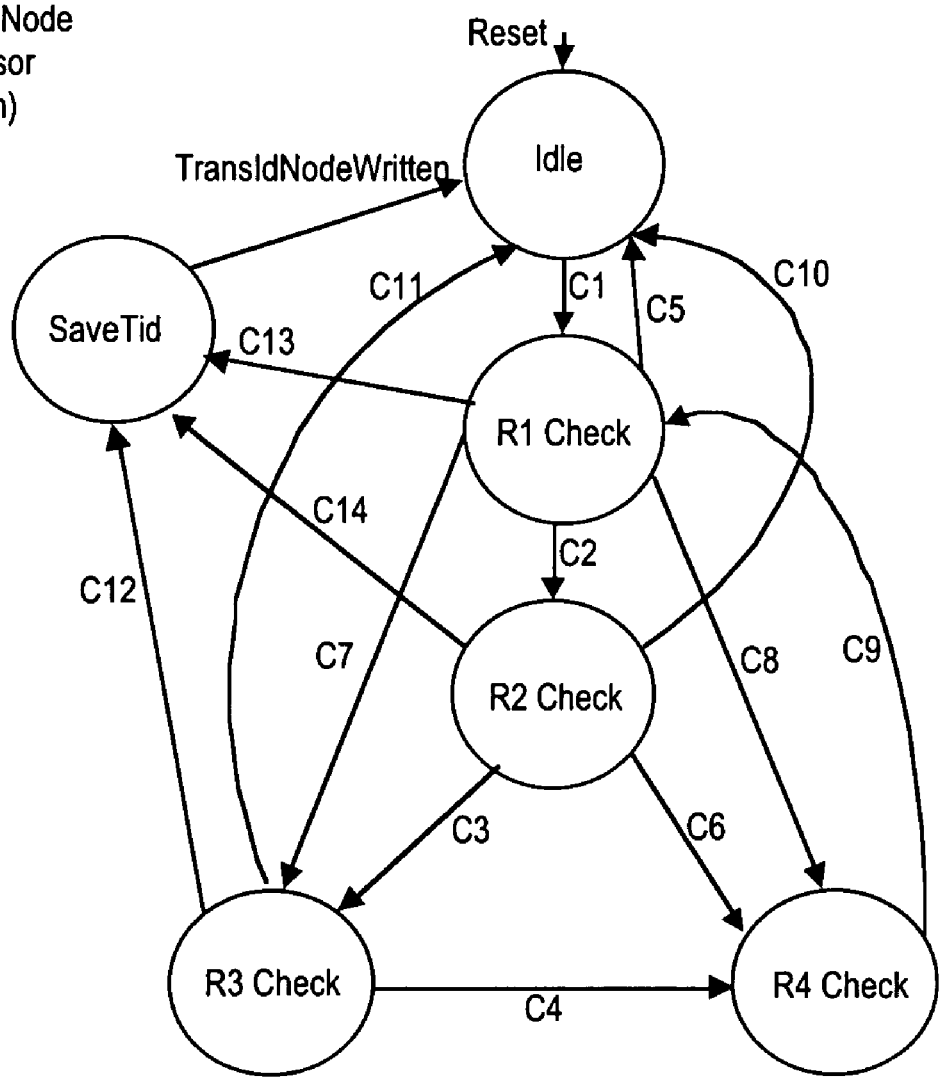
FIG. 9 is a state diagram illustrating states associated with the active node processor in accordance with one embodiment of the invention.
Figure 12:
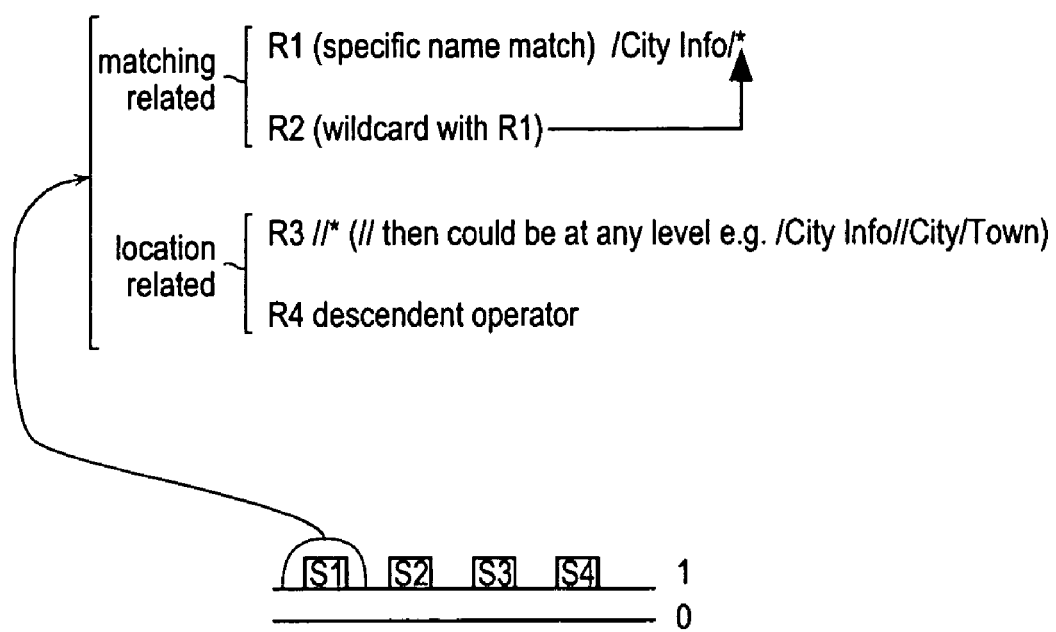
FIG. 12 illustrates rules that may be applied to perform the non-deterministic filtering of the XPATH or XPATH-type queries in accordance with one embodiment of the invention.

FIG. 9 is a state diagram illustrating states associated with the active node processor in accordance with one embodiment of the invention. The ANP machine processes one TransID node at a time, for four rules as illustrated in FIG. 12. The node is given to the ANP by the ALP machine. Any recursion required is processed as well. The initial Node and StateID structure comes from ALP copy 312 (which the ALP machine fetches from memory 310). The ANP maintains its own copy of the TIDN and StateID structures. The ALP machine transfers the data from its copy to the ANP when the ANP is done processing current node. Having separate copies enables ALP to get data for next node while ANP is working on current one. Flags used by the ANP include: TransIDNodeWritten: Between ANP (resets) and NDA (sets) and ANPNoRuleHit: Between ANP (resets) and ALP (sets).

Table 10 details the legends used by the active node processor state diagram of FIG. 9.

TABLE 10

Conditions: AlpSm implies ALP State Machine state and AnpSm implies ANP state machine state

| | |
|---|---|
| C1 | (((AlpSm== LdNxtState) & (StateLdDone)) | (AlpSm== Wait4PrevSrch) | (AlpSm== LastNode)) & (SearchRdy | SearchRdyFlag);<br>(SearchRdy indicates that StateID is available in search register) |
| C2 | (StateIDNode. starStateID != NULL) & (TransIDNodeWritten== '1'); |
| C3 | (TransIDNodeWritten== '1') & (StateNode.Type= EPSCHILD); |
| C4 | (TransIDNodeWritten== '1') & (StateIDNode. epsilonStateID != NULL); |
| C5 | (StateIDNode. starStateID == NULL) & (TransIDNodeWritten== '1') & (StateNode.Type != EPSCHILD) & (StateIDNode. epsilonStateID == NULL) & ANPNoRuleHit; |
| C6 | (TransIDNodeWritten== '1') & (StateNode.Type 1= EPSCHILD) & (StateIDNode. epsilonStateID !=NULL); |
| C7 | (StateIDNode. starStateID == NULL) & (TransIDNodeWritten== '1') & (StateNode.Type= EPSCHILD); |
| C8 | (StateIDNode. starStateID == NULL) & (TransIDNodeWritten== '1') & (StateNode.Type != EPSCHILD) & (StateIDNode. epsilonStateID != NULL); |
| C9 | NextStatNodeRead |
| C10 | (TransIDNodeWritten== '1') & (StateNode.Type != EPSCHILD) & (StateIDNode. epsilonStateID == NULL) & ANPNoRuleHit; |
| C11 | (TransIDNodeWritten== '1') & (StateIDNode. epsilonStateID == NULL) & ANPNoRuleHit; |
| C12 | (TransIDNodeWritten== '1') & (StateIDNode. epsilonStateID == NULL) & /ANPNoRuleHit; |
| C13 | (StateIDNode. starStateID NULL) && (TransIDNodeWritten== '1') && (StateNode.Type != EPSCHILD) & (StateIDNode. epsilonStateID == NULL) & /ANPNoRuleHit; |
| C14 | (TransIDNodeWritten== '1') & (StateNode.Type != EPSCHILD) & (StateIDNode. epsilonStateID == NULL) & /ANPNoRuleHit; |
| Actions | |
| Do_idle | None |
| Do_R1Check | If ((StateID != NULL) | (HasQuery='1')) (NULL= 0) (StateID is one which came out of search), reset ANPNoRuleHit. If (StateID != NULL), trigger the NDA machine (generate signal anp_tid_wr_req) to add a new TransIDNode (and update the TragetList to that node). Same time, update the "StateIDType" register with StateID field. Also update the NextPtr of previous NextNode.<br>Also generate signal node_with_query = StateID.HasQuery; (this signal goes to NDA machine). |

TABLE 10-continued

Conditions: AlpSm implies ALP State Machine state and AnpSm implies ANP state machine state

| | |
|---|---|
| Do_R2Check | While entering the state, Reset the flag TransIDNodeWritten<br>If (StarStateID!= NULL), reset ANPNoRuleHit, trigger the NDA machine (generate signal anp_tid_wr_req) to add a new TransIDNode with this StarIDNode (and update the TragetList to that node). For this, update StateIDType with StarStateID. Also update the NextPtr of previous NextNode.<br>Also generate signal node_with_query = StarStateID.HasQuery; (this signal goes to NDA machine). |
| Do_R3Check | While entering the state, Reset the flag TransIDNodeWritten<br>If (Type== EPSCHILD) reset ANPNoRuleHit, trigger the NDA machine (generate signal anp_tid_wr_req) to add a new TransIDNode with the current StateId (and update the TragetList to that node). The "type" would be EPSCHILD. For this update the StatIDType register (to be used by NDA machine) Also update the nextPtr of previous NextNode. |
| Do_R4Check | While entering the state, Reset the flag TransIDNodeWritten<br>Once the ndaSm == Idle, trigger (generate anp_sid_rd_req signal) to read stateIDNode (with EpsilonStateID)<br>(the machine ANP would update the HashPtr & HashSize) |
| Do_SaveTid | Trigger the NDA machine (generate signal anp_tid_update_req) to update current active node in main memory. While exiting, reset the flag TransIDNodeWritten. NOTE: The StateID to be used is always what came from ALP machine. This is specially important in case of recursion. |

Figure 10:
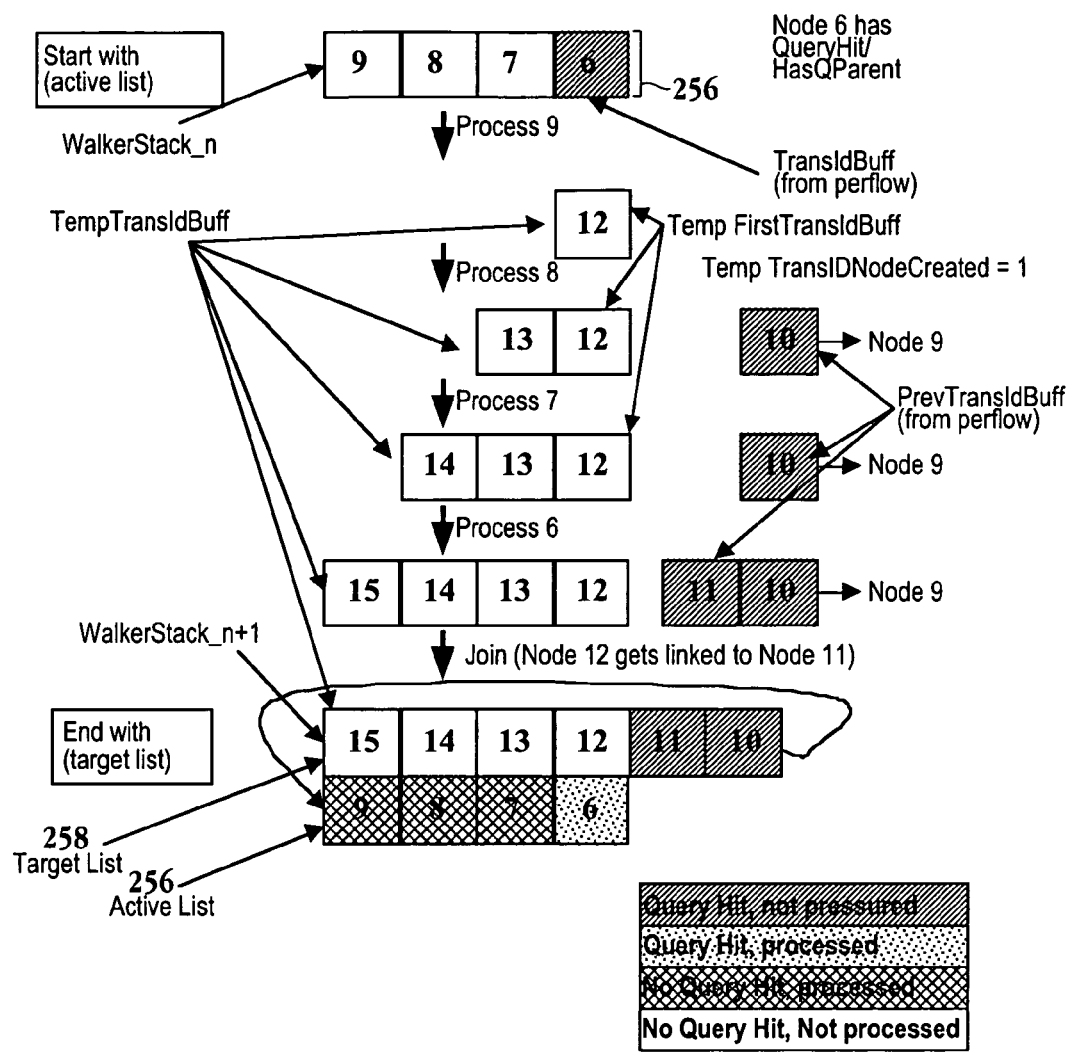
FIG. 10 is a simplified schematic diagram illustrating the formation of a target list in accordance with one embodiment of the invention.

FIG. 10 is a simplified schematic diagram illustrating the formation of a target list in accordance with one embodiment of the invention. The ANP creates two types of TIDNs in target list: Temporary (or non-committed) and Permanent (committed). If there is a query hit (HasQuery flag is set) or HasQParent is present, a committed TIDN is generated and if there is no query hit/ HasQParent, an uncommitted or temporary TIDN is created. It should be noted that the actual committing of a node to permanent status is postponed until a next SOE/EOE event (that is when it is known if a TIDN has a child or not). There is a probability that temporary TIDN will get eliminated (if they do not have children and are not children of another node with QueryHit) in a next round. As the ALP and the ANP work through the active list and create the target TIDNs, two potential lists are possible (of course, both of them could be empty). These two lists are kept separately and at the end of active list processing, the two lists are joined. FIG. 10 illustrates this process pictorially. It should be appreciated that FIG. 5 includes related information especially with respect to the structure of the walker stack. With regard to FIG. 10, element 9 generates element 12; element 8 generates element 13 and element 10; element 7 generates element 14; and element 6 generates element 10 and element 15. When the EOE arrives, the entire target list, except those with a Query hit (which includes those which have PostHit) or with HasQParent, is de-allocated. Similar to SOE processing, the NFA machine provides QueryCount and HeadNode information to CPU for all QueryHit nodes. In cases when there is no node created during SOE, a dummy rule (R0Node) is added to keep the pointer to a related element data (like attributes). This may be required for creation of document object model (DOM) tree.

Still referring to FIG. 10, active list 256 is the list currently being processed by the NFA block. At the end of the processing of active list 256, target list 258 is created. Beginning with active list 256, having elements 6-9, element 9 is first processed by the ANP. Element 9 generates element 12. Element 8 is then processed and generates elements 10 and 13. Element 7 is then processed and generates element 14. Thereafter, element 6 is processed and generates elements 11 and 15. Thus, two separate lists are maintained up to this point. That is, a first list of elements is maintained where there is a query hit (elements 10 and 11 and as well as a second list where there is no query hit (elements 12-15). These two lists are then linked to form target list 258 from the processing of active list 256. Target list 258 is then placed on top of the walker stack and will then become the active list when next SOE arrives. The processing is then repeated for each element of the new active list as described above. It should be appreciated that the walker stack has the head pointers pointing to the actual location of the elements (TIDNs) in memory.

FIG. 11 is a simplified schematic of a query with XPATH type format that would utilize the non-deterministic finite automaton filtering operation described herein in accordance with one embodiment of the invention. Query Q1 400 is one exemplary format for a query. Query 400 includes a structural matching portion and a predicate matching portion. The structural matching portion of query 400, which may also be referred to as the location portion, is used for the non-deterministic finite automaton filtering performed by the embodiments of the present invention. However, one skilled in the art will appreciate that the embodiments described herein also perform some predicate modifications which may be stored and later used for other purposes for the semantic processing, e.g., predicate validation. Message 402 includes SOE portion 404, CDATA portion 406, and end of element (BOB) portion 408. These portions are identified through the previous blocks prior to the IFE of the chip with reference to FIG. 1. For examples, flags may be set to identify the portion types of the productions delivered to the CMP module as referenced above. Dynamic data structure 410 illustrates the pushing and popping of the stack data structure in one embodiment. The root level (referred as 0 in 410) of stack data is pushed when SOD token comes in. The first level of data structure 410 is built upon receipt of the SOE for <CityInfo>. The second level occurs upon receipt of the SOE for <City>. Thereafter, upon receipt of EOE 408, the second level of data structure 410 is popped (removed). A second level is again added with the receipt of the second SOE for <City>, and a third level is added with receipt of the SOE for <town>. The third level is popped when the EOE </town> arrives and the second level is then popped upon the arrival of the EOE </city>.

FIG. 12 illustrates rules that may be applied to perform the non-deterministic filtering of the XPATH or XPATH-type queries in accordance with one embodiment of the invention. There are four types of rules R1-R4, in one embodiment. R1 and R2 are matching related rules, while rules R3 and R4 are location step related rules. Rule R1 covers a specific name match. For example, the /CityInfo/ portion of the query will satisfy rule R1 when a production having the exact anchor string of "CityInfo" is found. Rule R2 provides for a wild card to be used instead of specific name. Thus, staying with the example provided by rule R1, the /CityInfo/ portion of the query includes an /* as a wild card operator to signify anything in place of anchor in the token will satisfy rule R2. Rule R3, also called child of descendent operator (//) or Epsilon Child rule, may be represented by //CityInfo, would be satisfied when CityInfo is matched at any level (in production hierarchy/document hierarchy). Rule R4, which is also called recursion rule or Epsilon rule or rule of descendent operator, represents a rule where if a descendant operator (//) is specified then a certain action occurs, the certain actions being checking of R1 and R2 with respect to EpsilonStateIDWord (see table 8) and adding an Epsilon child node (the last one being the one which will allow for R3 when descendent SOEs arrive). Thus, if Rule 4 has been instituted, then for each descendant at any of the levels from the institution point, Rule 3 applies. With reference to FIG. 11, if there is a rule 4 hit with regard to dynamic data structure 410, then rule 3 descendants would have to be checked for each level thereafter of the walker stack.

Returning to FIG. 12, it should be appreciated that the function of the NFA module for a given SOE is to go through each possible state and look for matches under rules R1-R4. If there is a match, a new node (or nodes) is created for a new state. As mentioned above, the term nodes and elements may be used interchangeably. It should be appreciated that one state may generate up to five additional states (a case of three queries /a, /* and //* being there and "a" arriving), i.e., R1, R2, R4, getting satisfied, thereby creating 2 new nodes for a new state and then after R4 recursion again, R1, R2 getting satisfied and finally R3 getting added. As illustrated in FIG. 12, state ID Si of the TIDN at level 1 of the dynamic data structure points to a state node 133, which is checked against the four rules and possible future states may be generated.

In summary, a method and system for filtering data according to a non-deterministic finite automaton is provided. One skilled in the art will appreciate that in deterministic finite automata, for each state there is none or exactly one transition for each possible input. In non-deterministic finite automata, there can be none or one or more than one transition from a given state for a given possible input. Furthermore, the functionality described above is performed through hardware blocks as described with reference to the Figures and corresponding discussion, except where specific functions are identified as being software based. In one embodiment, the NFA is initialized to a first state. A token representing a portion of a message is received by a processor. As noted above, the portion of the message may be alternatively represented by a production. A query is compiled by a rules organizer into a NFA state table and a lookup table. The query is of an XPATH type format in one embodiment. A match of the token value is searched for in the lookup table based on the first state of the NFA and a corresponding state record in the NFA state table. A plurality of next states are created based on a search record. As described above, through the utilization of the ANP and ALP the next states or future states are generated and embedded in a dynamic data structure. The plurality of next states are stacked above the first state in the dynamic data structure.

It will be apparent to those skilled in the art that the procedures described above and in the corresponding Figures are performed in hardware using logic gates, and therefore not necessarily sequentially as might be suggested by any flowcharts. Thus, many operations may be performed in parallel and/or in a different order than presented above. Furthermore, there may be instances where a particular operation is combined with other operations such that no intermediary state is provided. Likewise various operations may be split into multiple steps with one or more intermediary states. The hardware devices incorporate logic typically designed using a hardware description language (HDL) or other means known to those skilled in the art of integrated circuit design. The generated circuits will include numerous logic gates and connectors to perform various operations and do not rely on software instructions. However, it is possible to implement the procedures described above in software or partially in software for execution on a processing device.

With the above embodiments in mind, it should be understood that the invention may employ various computer-implemented operations involving data stored in computer systems. These operations include operations requiring manipulation of physical quantities. Usually, though not necessarily, these quantities take the form of electrical or magnetic signals capable of being stored, transferred, combined, compared, and otherwise manipulated. Further, the manipulations performed are often referred to in terms, such as producing, identifying, determining, or comparing.

The above described invention may be practiced with other computer system configurations including hand-held devices, microprocessor systems, microprocessor-based or programmable consumer electronics, minicomputers, mainframe computers and the like. The invention may also be practiced in distributing computing environments where tasks are performed by remote processing devices that are linked through a communications network.

Although the foregoing invention has been described in some detail for purposes of clarity of understanding, it will be apparent that certain changes and modifications may be practiced within the scope of the appended claims. Accordingly, the present embodiments are to be considered as illustrative and not restrictive, and the invention is not to be limited to the details given herein, but may be modified within the scope and equivalents of the appended claims. In the claims, elements and/or steps do not imply any particular order of operation, unless explicitly stated in the claims.

The invention claimed is:

1. A structural matching engine for non-deterministic finite automaton filtering operations, comprising:
    an active node processor (ANP) configured to process a state of an active list to determine possible future states of a non-deterministic finite automaton (NFA), the ANP processing the state according to rules; and
    an active list processor (ALP) configured to initiate a lookup for a token value corresponding to the state of the active list, the ALP providing a next state of the active list to the ANP for processing according to the rules upon completion of the processing of the state by the ANP, wherein the possible future states of the NFA are linked by the ALP to form a target list, the target list stacked on top of the active list in a stack structure, wherein the structural matching engine is implemented in hardware.

2. The structural matching engine of claim 1, wherein the ALP initiates a next lookup for the next state while the ANP is processing the state.

3. The structural matching engine of claim 1, wherein each of the states include a TransID Node (TIDN) portion and a StateNode portion.

4. The structural matching engine of claim 1, wherein the stack structure is a walker stack and wherein stacks of the stack structure are added for each start token of a message being processed and stacks of the stack structure are removed for each end token of the message being processed.

5. The structural matching engine of claim 1, wherein the ALP maintains a first and second list while the ANP processes the states of the active list, the first list representing elements that match a query and the second list representing elements not matching the query.

6. The structural matching engine of claim 3, wherein the query is formatted in XPATH language.

7. The structural matching engine of claim 3, wherein the TIDN portion includes a first pointer to a parent of the TIDN and the ALP converts the first pointer to a corresponding offset, the offset referencing a beginning of a token stream.

8. The structural matching engine of claim 3, wherein the TIDN node portion includes a second pointer to a token value stored in an attribute store table and the ALP converts the second pointer to a corresponding offset, the offset referencing a beginning of a token stream.

9. The structural matching engine of claim 4 having an intelligence to handle queries which require all tokens which are structurally under a start token, wherein the intelligence to handle queries includes setting of a flag for all TIDNs and their descendents corresponding to that start token.

10. A structural matching engine, comprising:
a microprocessor coupled to memory, wherein the microprocessor is programmed to perform non-deterministic finite automaton filtering operations through:
an active node processor (ANP) which processes a state of an active list to determine possible future states of a non-deterministic finite automaton (NFA), the ANP processing the state according to rules; and
an active list processor (ALP) which initiates a lookup for a token value corresponding to the state of the active list, the ALP providing a next state of the active list to the ANP for processing according to the rules upon completion of the processing of the state by the ANP, wherein the possible future states of the NFA are linked by the ALP to form a target list, the target list stacked on top of the active list in a stack structure.

11. The structural matching engine of claim 10, wherein the ALP initiates a next lookup for the next state while the ANP is processing the state.

12. The structural matching engine of claim 10, wherein each of the states include a TransID Node (TIDN) portion and a StateNode portion.

13. The structural matching engine of claim 10, wherein the stack structure is a walker stack and wherein stacks of the stack structure are added for each start token of a message being processed and stacks of the stack structure are removed for each end token of the message being processed.

14. The structural matching engine of claim 10, wherein the ALP maintains a first and second list while the ANP processes the states of the active list, the first list representing elements that match a query and the second list representing elements not matching the query.

15. The structural matching engine of claim 12, wherein the query is formatted in XPATH language.

16. The structural matching engine of claim 12, wherein the TIDN portion includes a first pointer to a parent of the TIDN and the ALP converts the first pointer to a corresponding offset, the offset referencing a beginning of a token stream.

17. The structural matching engine of claim 12, wherein the TIDN node portion includes a second pointer to a token value stored in an attribute store table and the ALP converts the second pointer to a corresponding offset, the offset referencing a beginning of a token stream.

18. The structural matching engine of claim 13 having an intelligence to handle queries which require all tokens which are structurally under a start token, wherein the intelligence to handle queries includes setting of a flag for all TIDNs and their descendents corresponding to that start token.

* * * * *